United States Patent
Matsuura

(10) Patent No.: US 9,960,683 B2
(45) Date of Patent: May 1, 2018

(54) ELECTRONIC CIRCUIT DEVICE

(71) Applicant: TDK Corporation, Minato-ku, Tokyo (JP)

(72) Inventor: Ken Matsuura, Tokyo (JP)

(73) Assignee: TDK Corporation (JP)

( * ) Notice: Subject to any disclaimer, the term of this patent is extended or adjusted under 35 U.S.C. 154(b) by 268 days.

(21) Appl. No.: 14/499,405

(22) Filed: Sep. 29, 2014

(65) Prior Publication Data

US 2015/0155086 A1    Jun. 4, 2015

(30) Foreign Application Priority Data

Dec. 4, 2013 (JP) ................................. 2013-251541

(51) Int. Cl.
  H01F 5/00  (2006.01)
  H02M 3/24  (2006.01)
  H01F 19/00  (2006.01)
  H01F 27/28  (2006.01)
  H02M 3/28  (2006.01)

(52) U.S. Cl.
  CPC .......... *H02M 3/24* (2013.01); *H01F 27/2804* (2013.01); *H02M 3/28* (2013.01); *H01F 2027/2809* (2013.01)

(58) Field of Classification Search
  CPC .......... H02M 3/24; H01F 27/40; H01F 21/08; H01F 38/14; H01G 2/00; H02J 5/005
  See application file for complete search history.

(56) References Cited

U.S. PATENT DOCUMENTS 6,021,052 A * 2/2000 Unger ............... H02J 9/062
  363/133

FOREIGN PATENT DOCUMENTS

| JP | H06-325949 A | 11/1994 |
| JP | 2010-178439 A | 8/2010 |
| JP | 2012-134291 A | 7/2012 |

OTHER PUBLICATIONS

Japanese Office Action dated May 28, 2015 for Japanese Application No. 2013-251541 with English translation (9 pages).
Huang et al., "Matrix Transformer for LLC Resonant Converters", Applied Power Electronics Conference and Exposition (APEC), 2013 Twenty-Eighth Annual IEEE, pp. 2078-2083, Mar. 2013.
Ji et al., "High Frequency High Power Density 3D Integrated Gallium Nitride Based Point of Load Module", Energy Conversion Congress and Exposition (ECCE), 2012 IEEE, pp. 4267-4273, Sep. 2012.

* cited by examiner

*Primary Examiner* — Nguyen Tran
*Assistant Examiner* — Monica Mata
(74) *Attorney, Agent, or Firm* — Harness, Dickey & Pierce, P.L.C.

(57) ABSTRACT

An electronic circuit device includes a board and a transformer that is provided at the board and that has a primary winding member and a secondary winding member. The primary winding member is configured with a primary winding that is provided at the board and a primary side element that is electrically connected to the primary winding member. The secondary winding member is configured with a secondary winding that is provided at the board and a secondary side element that is electrically connected to the secondary winding member.

20 Claims, 17 Drawing Sheets

ELECTRONIC CIRCUIT DEVICE

CROSS-REFERENCE TO RELATED APPLICATION

This application claims priority to Japanese Patent Application No. 2013-251541 filed Dec. 4, 2013 which is hereby expressly incorporated by reference herein in its entirety.

BACKGROUND

The present invention relates to an electronic circuit device in which electric power is transmitted between a primary side and a secondary side of a transformer.

As a conventional electronic circuit device, for instance, Japanese Patent Publication Number 2012-134291 discloses a switching power supply device explained below. The switching power supply device has a transformer as one of its parts. The transformer is configured with a core, a primary winding and a secondary winding. Further, the switching power supply device transmits electric power by magnetically connecting between the primary winding and the secondary winding via the core while realizing electrical insulation.

In Japanese Patent Publication Number 2012-134291, the transformer has a sheet transformer configuration and a switching element (a switch) that is provided at a primary side of the transformer. The transformer and the switching element are configured as different parts. Further, the transformer and the switching element are separately mounted on a board. That is, because the transformer and the switching element are spaced apart from each other at the mounting points of the transformer and the switching element, an area of the board naturally becomes large. Thus, because the device increases in size, a parasitic inductance of the circuit increases.

As countermeasures for these problems explained above, a non-patent literature, Daocheng Huang, Shu Jin, Fred C. Lee, "Matrix transformer for LLC resonant converters" (Applied Power Electronics Conference and Exposition (APEC)), March 2013, Twenty-Eight Annual IEEE, Pages 2078-2083; Digital Object Identifier 10.1109/APEC.2013.6520582, discloses LLC resonant converters. The disclosed LLC resonant converter has a synchronous rectification switching element and a smoothing capacitor as a secondary side circuit of a transformer. A distance between the transformer and the secondary side circuit is shortened by mounting the synchronous rectification switching element and the smoothing capacitor explained above in a middle of a secondary winding of the transformer.

The LLC resonant converter that is disclosed in the non-patent literature is as follows: the secondary winding is formed in a pattern at an outer layer of a stacked board and the secondary side element such as the synchronous rectification switching element and the smoothing capacitor are directly mounted in the middle of the secondary winding on a surface of the board. However, because a primary winding of the transformer is formed in a pattern in an internal layer of the board, a primary side element cannot be mounted in a middle of the primary winding. As a result, a miniaturization of an entire device cannot be realized.

SUMMARY

Accordingly, an object of the present invention is to provide an electronic circuit device that has a compact structure on both of a primary side and a secondary side of a transformer so that a miniaturization of an entire device can be realized.

An electronic circuit device according to one aspect of the present invention includes: a board; and a transformer that is provided at the board and that has a primary winding member and a secondary winding member. The primary winding member is configured with a primary winding that is provided at the board and a primary side element that is electrically connected to the primary winding member. The secondary winding member is configured with a secondary winding that is provided at the board and a secondary side element that is electrically connected to the secondary winding member.

In the electronic circuit device according the above aspect, the board has a first surface and a second surface opposite to the first surface. It is preferred that the primary winding is located on the first surface of the board. It is preferred that the secondary winding is located on the second surface of the board.

In the electronic circuit device according the above aspect, the primary and secondary windings are located on the board. It is preferred that at least one of the primary and secondary windings is further located in the board.

In the electronic circuit device according the above aspect, the board has a first surface and a second surface opposite to the first surface. It is preferred that the primary and secondary windings are located only in the board. The primary winding may be located at a side of the first surface and the secondary winging unit may be located at a side of the second surface.

In the electronic circuit device according the above aspect, a first current path is formed between an input terminal of the electronic circuit device and the primary winding member. A second current path is formed between an output terminal of the electronic circuit device and the secondary winding member. It is further preferred that one of the first and second current paths is located so as to substantially perpendicularly abut one of the primary and second winding members.

In the electronic circuit device according the above aspect, at least one of the first and second elements may be a field effect transistor. An inner shield layer may be provided on an inside of the board. The inner shield layer may be located right under the field effect transistor.

In the electronic circuit device according the above aspect, a plurality of primary elements may configure a primary side circuit. A plurality of secondary elements may configure a secondary side circuit. Each of the primary and secondary side circuits may be configured with one of a half bridge circuit and a full bridge circuit.

According to an electronic circuit device of the present invention, because a primary side element is mounted on or integrated in a primary winding member as a part of the primary winding member of a transformer. Further, at the same time, a secondary side element is mounted on or integrated in a secondary winding member as a part of the secondary winding member of the transformer. Thus, a distance between the transformer and the primary side element and a distance between the transformer and the secondary side element can be made close. Therefore, because the electronic circuit device becomes a compact structure on both primary and secondary sides of the transformer, it is possible to provide the electronic circuit device in which a miniaturization of an entire device can be realized.

Further, the primary winding member and the secondary winding member are respectively located to one surface and the other surface of the board. The primary side element(s) and the secondary side element(s) can function as a part of the winding members by mounting them on each of the one surface and the other surface of the board. Thus, a loss of the winding members including the elements can be suppressed and the miniaturization of the entire device can be realized.

Further, conductors that correspond to the primary winding member and the secondary winding member are provided at not only the outer layer but also the inner layer of the board and are suitably connected. As a result, it can easily increase the number of turns of the primary winding member and the secondary winding member and increase an amount of electricity that can be flown in the primary winding member and the secondary winding member.

Further, when a winding is located at only inside of the board without being exposed at an outside surface of the board, a mountable area for the elements increases. As a result, the miniaturization of the electronic circuit device can be promoted.

Further, when the number of the primary side elements that are mounted on or integrated in the primary winding member and the number of the secondary side elements that are mounted on or integrated in the secondary winding member are respectively at least two or more, the primary side circuit and the secondary side circuit can be freely laid out by suitably and respectively arranging the primary side elements and the secondary side elements at the one surface and the other surface of the board and by connecting the primary winding and the secondary winding via, for example, a through hole.

Further, when the following conditions of positional relationships are met, it can be possible that a magnetic flux that is generated by an electric current that flows in a current path reaching winding members from input and output terminals of the electronic current device does not cross the primary winding member and the secondary winding member so that the magnetic flux does not affect the transformer performance. Specifically, the conditions of the positional relationships are as follows: a first current path that is formed from an input terminal of the electronic circuit device to the primary winding member explained above substantially perpendicularly abuts the primary winding member; or a second current path that is formed from an output terminal of the electronic circuit device to the secondary winding member explained above substantially perpendicularly abuts the secondary winding member.

Further, because an inner shield layer is provided as an inner layer of the board, it is possible to prevent a proximity effect that is generated between an FET and a winding member. As a result, it is possible to provide a high efficiency electronic circuit device in which a conduction loss of an FET is decreased.

Further, it is possible to provide an electronic circuit device in which the primary side circuit and the secondary side circuit of the transformer are configured as a half bridge circuit or a full bridge circuit.

BRIEF DESCRIPTION OF THE DRAWINGS

FIG. 2A corresponds to a cross sectional view of 1-1' line seen from an arrow direction of FIGS. 7 and 9. FIG. 2B corresponds to a cross sectional view of 2-2' line seen from an arrow direction of FIGS. 7 and 9.

FIG. 5A corresponds to a cross sectional view of 3-3' line seen from an arrow direction of FIGS. 10 and 12. FIG. 5B corresponds to a cross sectional view of 4-4' line seen from an arrow direction of FIGS. 10 and 12.

FIG. 13A shows a schematic view of a vertical-structure FET. FIG. 13B shows a schematic view of a horizontal-structure FET.

DESCRIPTION OF EXEMPLARY EMBODIMENTS

An electronic circuit device according to an embodiment of the present invention is explained below with reference to the drawings.

Figure 1:
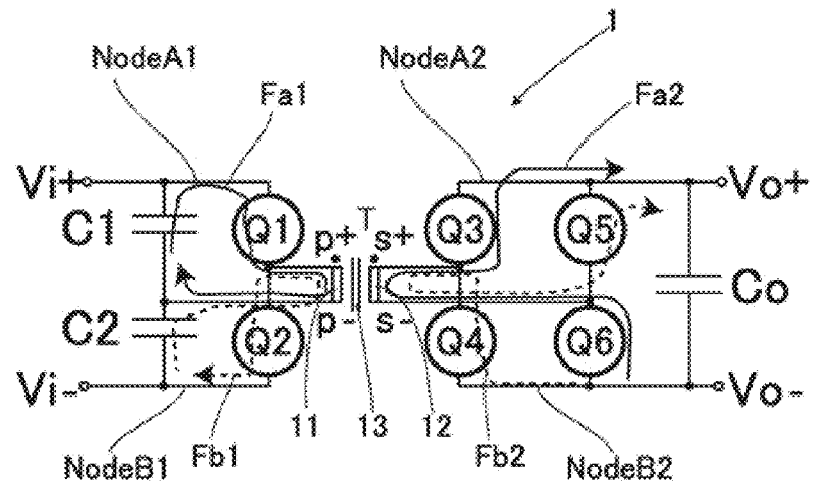
FIG. 1 is a circuit diagram that shows a principal part of a DC-DC converter as an electronic circuit device according to an embodiment of the present invention.

FIG. 1 shows a main circuit configuration of a current resonant DC-DC converter 1 as an example of an electronic circuit device. The DC-DC converter 1 has a half bridge circuit that is configured with a series circuit of two switches Q1, Q2 and capacitors C1, C2 as a primary side circuit of a transformer T. Further, the DC-DC converter 1 has a full bridge circuit that is configured with four switches Q3, Q4, Q5 and Q6 as a secondary side circuit of the transformer T. The half bridge circuit explained above is configured by respectively connecting a series circuit of the high side switch Q1 and the low side switch Q2, and a series circuit of the capacitors C1 and C2 between input terminals Vi+ and Vi− of the DC-DC converter 1. The full bridge circuit explained above is configured by respectively connecting a series circuit of the high side switch Q3 and the low side switch Q4, and a series circuit of the high side switch Q5 and the low side switch Q6 between output terminals Vo+ and Vo− of the DC-DC converter 1. The half bridge circuit is formed by connecting the series circuit of the capacitors C1 and C2 between the input terminals Vi+ and Vi− in the primary side circuit of the transformer T. As a result, it is possible to charge a desired charging voltage to each of the capacitors C1 and C2 by using an input voltage that is applied between the input terminals Vi+ and Vi−. Further, an output capacitor Co is connected between the output terminals Vo+ and Vo− of the secondary side circuit.

The transformer T transfers electric power between the primary side and the secondary side in a condition in which the primary side is electrically isolated form the secondary side. The transformer T is formed by winding a primary winding 11 and a secondary winding 12 around a magnetic core 13 that is used in common. Here, in the primary side of the transformer T, one terminal p+ (a through hole 24A) of the primary winding 11 is connected to a node connected between the high side switch Q1 and the low side switch Q2. The other terminal p− (a through hole 24B) of the primary winding 11 is connected to a node connected between the capacitor C1 and the capacitor C2. Further, in the secondary side of the transformer T, one terminal s+ (a through hole 24C) of the secondary winding 12 is connected to a node connected between the high side switch Q3 and the low side switch Q4. The other terminal s− (a through hole 24D) of the secondary winding 12 is connected to a node connected between the high side switch Q5 and the low side switch Q6.

In the DC-DC converter 1, a driver circuit is mounted. The driver circuit supplies a pulse driving signal to each of the switches Q1-Q6 that are all configured as a semiconductor switching element with a control terminal. The driver circuit supplies the pulse driving signal, which performs alternative switching operations of the high side switch Q1 and the low side switch Q2, to the half bridge circuit in the primary side of the transformer T. At the same time, the driver circuit supplies the following pulse driving signal to the full bridge circuit in the secondary side of the transformer T. Specifically, the pulse driving signal performs a switching operation of the high side switch Q3 and the low side switch Q6 in synchronization with the high side switch Q1 and performs a switching operation of the low side switch Q4 and the high side switch Q5 in synchronization with the low side switch Q2.

Further, when the switches Q1, Q3 and Q6 are in ON periods, in the primary side of the transformer T, the charging voltage of the capacitor C1 is applied to the primary winding 11 in a condition in which one terminal p+ is positive with respect to the other terminal p−. As a result, in the secondary side of the transformer T, an induced voltage of the secondary winding 12 is output between the output terminals Vo+ and Vo−. The induced voltage is generated in a condition in which one terminal s+ is positive with respect to the other terminal s−. When the switches Q1, Q3 and Q6 are in the ON periods as discussed above, flows of electric currents Fa1 and Fa2, which are respectively generated in the primary side and the secondary side of the transformer T, are respectively shown by arrows with solid lines in FIG. 1.

In addition, when the switches Q2, Q4 and Q5 are in ON periods, in the primary side of the transformer T, the charging voltage of the capacitor C2 is applied to the primary winding 11 in a condition in which the other terminal p− is positive with respect to the one terminal p+. As a result, in the secondary side of the transformer T, an induced voltage of the secondary winding 12 is output between the output terminals Vo+ and Vo−. The induced voltage is generated in a condition in which the other terminal s− is positive with respect to the one terminal s+. When the switches Q2, Q4 and Q5 are in the ON periods as discussed above, flows of electric currents Fb1 and Fb2, which are respectively generated in the primary side and the secondary side of the transformer T, are respectively shown by arrows with dotted lines in FIG. 1. Further, in the present embodiment, because a series resonance of a leakage inductance and the capacitors C1, C2 for resonance of the transformer T is used, a resonance current having a sine wave is generated in the primary side circuit and a zero current switching of the high side switch Q1 and the low side switch Q2 is realized.

The switches Q1-Q6 shown in FIG. 1 are all configured with field effect transistors, that is, FETs. Preferably, the vertical-structure FET in which the current path is longitudinally formed is used.

Figure 2A:
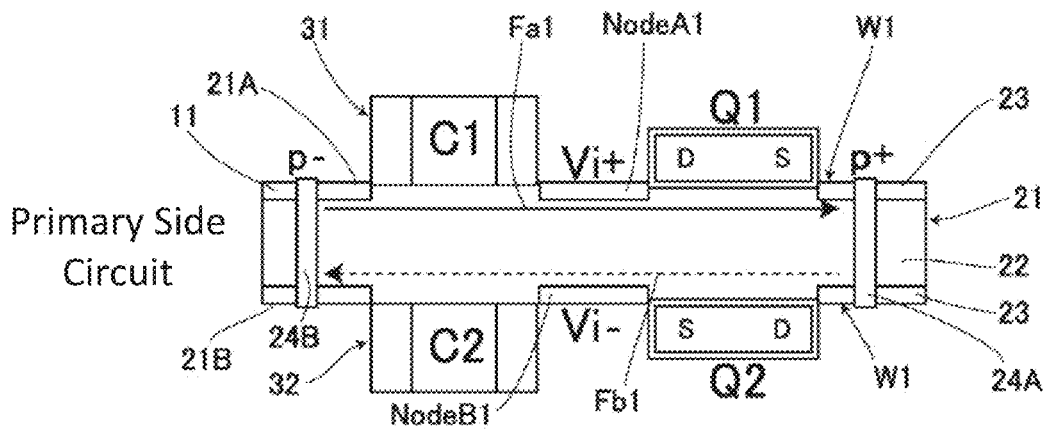
FIGS. 2A and 2B are cross sectional views showing parts arrangement of a primary side circuit and a secondary side circuit, respectively, of a DC-DC converter according to an embodiment of the present invention.
Figure 2B:
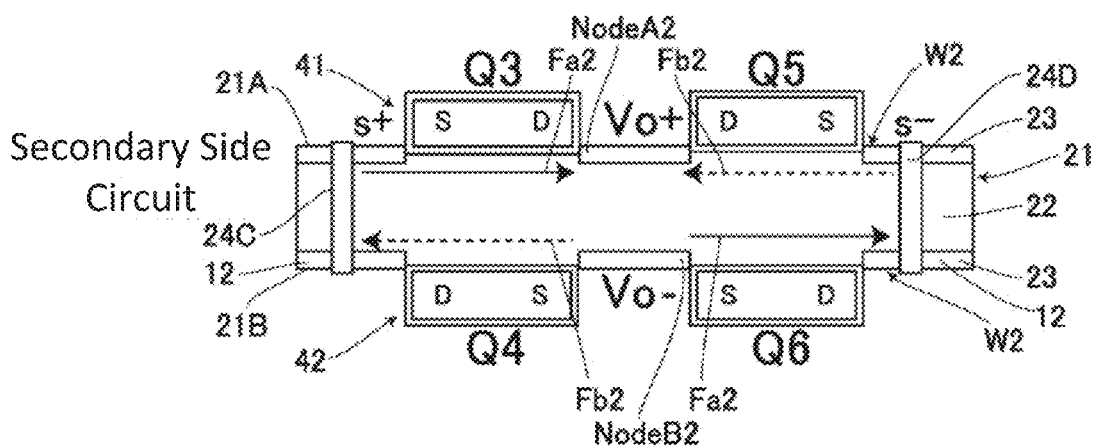

FIGS. 2A and 2B are cross sectional views that respectively show parts arrangement of the primary side circuit and the secondary side circuit of the DC-DC converter 1 shown in FIG. 1 in the present embodiment. Sectional areas of FIGS. 2A and 2B respectively correspond to cross sectional views of 1-1' and 2-2' lines shown in FIGS. 7 and 9 that will be explained below. In the drawings, a reference "D" of each of the switches Q1-Q6 corresponds to a drain and a reference "S" of each of the switches Q1-Q6 corresponds to a source. Further, a board 21 is formed by providing a patterned conductor 23 on a surface (one or both sides) of an insulating base 22. Further, the board 21 may also be a multilayer structure. The conductor 23 is formed in a desired shape with, for instance, a copper foil or a metal plate.

Figure 3:
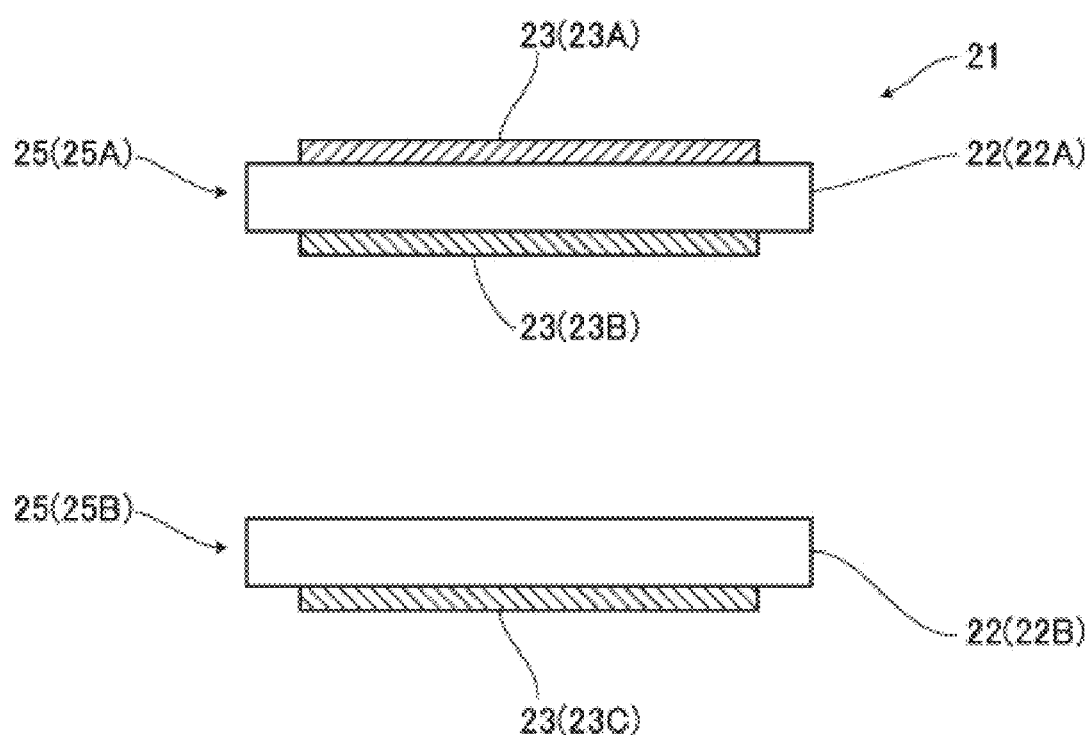
FIG. 3 is a schematic cross sectional view showing boards of FIGS. 2A and 2B.
Figure 4:
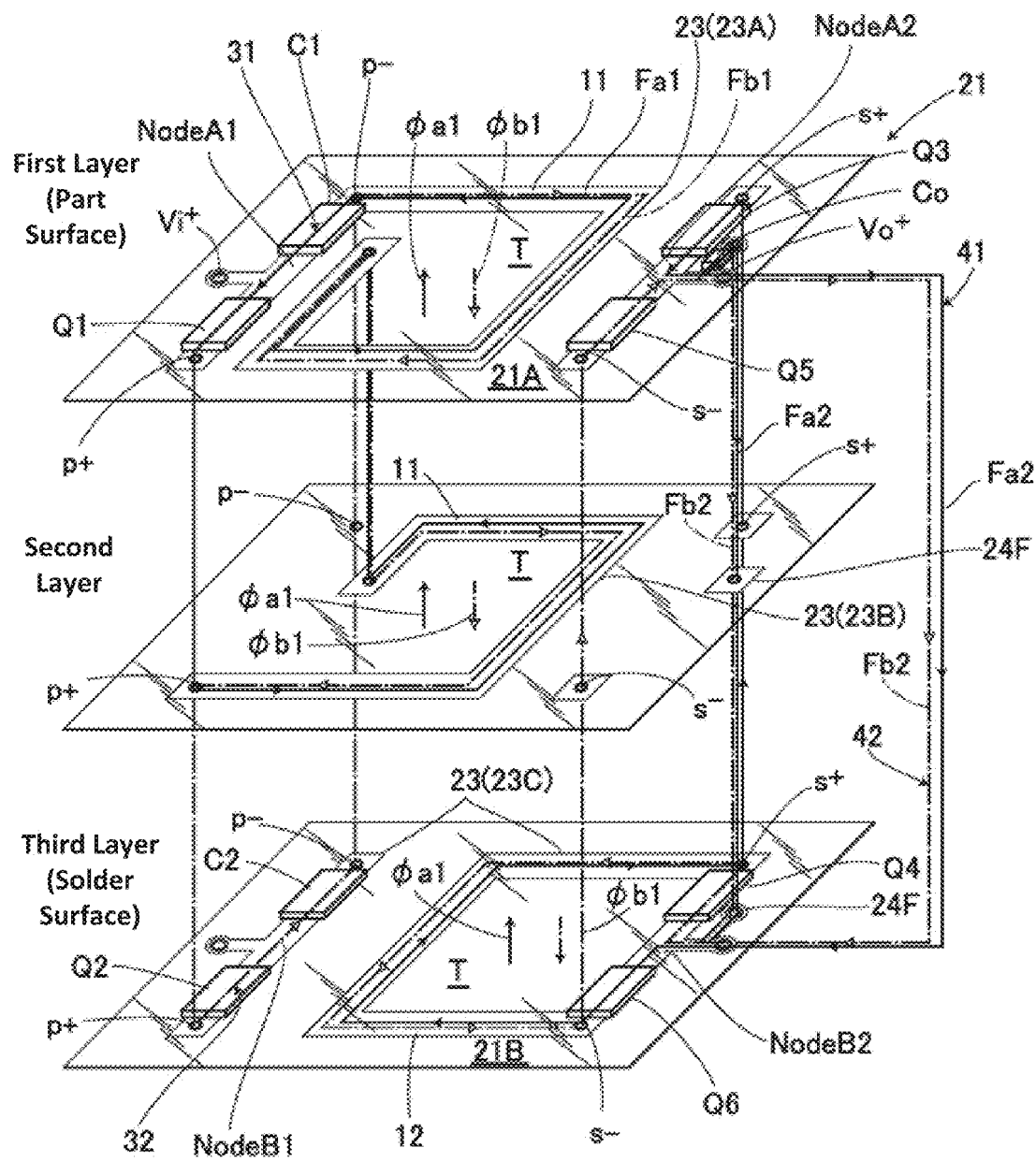
FIG. 4 is a perspective view that shows an arrangement relationship between conductors and each of elements of a DC-DC converter according to an embodiment of the present invention.

FIG. 3 is a schematic view that shows a configuration of the board 21 that has a multilayer structure. FIG. 4 is a perspective view that shows an inside of the board 21 that has the multilayer structure. In FIG. 4, although the magnetic core 13 is omitted, Φa1 and Φb1 correspond to magnetic fluxes that are generated in the magnetic core 13 by the primary side currents Fa1 and Fb1 of the transformer T. Their arrows show directions of the magnetic fluxes. In FIG. 4, a first conductor 23A, the high side switches Q1, Q3, Q5 and the capacitor C1 are respectively located on a first layer of the board 21. A second conductor 23B is located on a second layer of the board 21. Further, a third conductor 23C, the low side switches Q2, Q4, Q6 and the capacitor C2 are respectively located on a third layer of the board 21. Here, the first layer of the board 21 corresponds to a part surface 21A as one surface of the board 21. Further, the third layer of the board 21 corresponds to a solder surface 21B as the other surface of the board 21. In the present embodiment, the transformer T in which the primary winding member W1 has two turns and the secondary winding member W2 has one turn is explained. However, the number of turns of the primary winding member W1 and the secondary winding member W2 is not particularly limited.

A configuration of the primary side circuit the DC-DC converter 1 is explained with reference to FIGS. 1-4. The primary side circuit of the DC-DC converter 1 is configured by mounting the capacitor C1 and the high side switch Q1 on the part surface 21A of the board 21 and by mounting the capacitor C2 and the low side switch Q2 on the solder surface 21B of the board 21. A drain D of the high side switch Q1 and a positive potential side of the capacitor C1 are connected by a node NodeA1 of the conductor 23 on the part surface 21A of the board 21. Further, the input terminal Vi+ is led out from a connecting part of the node NodeA1. A source S of the high side switch Q1 is connected to the one terminal p+(the through hole 24A) of the primary winding 11 and a negative potential side of the capacitor C1 is connected to the other terminal p– (the through hole 24B) of the primary winding 11.

On the other hand, a source S of the low side switch Q2 and a negative potential side of the capacitor C2 are connected by a node NodeB1 of the conductor 23 on the solder surface 21B of the board 21. Further, the input terminal Vi– is led out from a connecting part of the node NodeB1. A drain D of the low side switch Q2 is connected to the one terminal p+ (the through hole 24A) of the primary winding 11 and a positive potential side of the capacitor C2 is connected to the other terminal p– (the through hole 24B) of the primary winding 11. Further, the source S of the high side switch Q1 and the drain D of the low side switch Q2, which are respectively located at front and back surfaces of the board 21, are electrically connected via the through hole 24A. Similarly, the negative potential side of the capacitor C1 and the positive potential side of the capacitor C2, which are respectively located at the front and back surfaces of the board 21, are electrically connected via the through hole 24B. The through holes 24A and 24B penetrate the board 21 as the connecting parts.

Because the arrangement of each part in the primary side circuit and the relative arrangement between the primary winding 11 and each part are adopted as explained above, the magnetic fluxes Φa1 and Φb1 are generated by the electric current Fa1, which flows in the capacitor C1 and the high side switch Q1, and the electric current Fb1, which flows in the low side switch Q2 and the capacitor C2. Because the magnetic fluxes Φa1 and Φb1 are magnetically coupled with the secondary winding 12, the electric currents Fa2 and Fb2 can flow in the secondary side circuit.

Next, a configuration of the secondary side circuit of the DC-DC converter 1 is explained with reference to FIGS. 1-4. The secondary side circuit of the DC-DC converter 1 is configured by mounting the high side switches Q3 and Q5 on the part surface 21A of the board 21 and by mounting the low side switches Q4 and Q6 on the solder surface 21B of the board 21. Drains D of the high side switches Q3 and Q5 are connected by a node NodeA2 of the conductor 23 on the part surface 21A of the board 21. The output terminal Vo+ is led out from a connecting part of the node NodeA2. Further, a source S of the high side switch Q3 is connected to the one terminal s+ (the through hole 24C) of the secondary winding 12 and a source S of the high side switch Q5 is connected to the other terminal s– (the through hole 24D) of the secondary winding 12.

On the other hand, sources S of the low side switches Q4 and Q6 are connected by a node NodeB2 of the conductor 23 on the solder surface 21B of the board 21. The output terminal Vo– is led out from a connecting part of the node NodeB2. Further, a drain D of the low side switch Q4 is connected to the one terminal s+ (the through hole 24C) of the secondary winding 12 and a drain D of the low side switch Q6 is connected to the other terminal S– (the through hole 24D) of the secondary winding 12. Further, the source S of the high side switch Q3 and the drain D of the low side switch Q4, which are respectively located at the front and back surfaces of the board 21, are electrically connected via the through hole 24C. Similarly, the source S of the high side switch Q5 and the drain D of the low side switch Q6, which are respectively located at the front and back surfaces of the board 21, are electrically connected via the through hole 24D. The through holes 24C and 24D penetrate the board 21 as the connecting parts.

Because the arrangement of each part in the secondary side circuit and the relative arrangement between the secondary winding 12 and each part are adopted as explained above, the secondary winding member W2 can be magnetically coupled with the magnetic fluxes Φa1 and Φb1 that are generated by the electric currents Fa1 and Fb1 that flow in the primary winding 11. Specifically, the secondary winding member W2 contains the high side switch Q3 and the low side switch Q6, or the high side switch Q5 and the low side switch Q4.

In the present embodiment, the primary side circuit explained above is configured with a first primary side closed circuit 31 and a second primary side closed circuit 32. Specifically, the first primary side closed circuit 31 is configured with the capacitor C1 that corresponds to a first primary side element, the high side switch Q1 that corresponds to a second primary side element and the primary winding 11 of the transformer T. The second primary side closed circuit 32 is configured with the capacitor C2 that corresponds to a third primary side element, the low side switch Q2 that corresponds to a fourth primary side element and the primary winding 11 of the transformer T. A configuration of the first primary side closed circuit 31 starts at the node NodeA1, which is located at the positive potential side of the capacitor C1 and a part of the conductor 23, and continues through the high side switch Q1, the terminal p+ of the transformer T, the terminal p– after passing through the primary winding 11, and the negative potential side of the capacitor C1, in this order, and goes back to the node NodeA1. The substantial primary winding member W1 of the transformer T is formed with the capacitor C1, the high side switch Q1 and the primary winding 11 explained above. That is, in the present embodiment, as the configuration, the capacitor C1 and the high side switch Q1 are inserted in and connected to the primary winding member W1 of the transformer T. The input terminal Vi+ of the positive electrode is led out from the node NodeA1 of the conductor 23 that is contained in the substantial winding structure.

When the magnetic flux Φa1 generated by the electric current Fa1 that flows in the first primary side closed circuit 31 crosses with the secondary winding member W2 of the transformer T, the magnetic flux Φa1 is magnetically coupled with the secondary winding member W2. On the other hand, the magnetic flux generated by an input current, which flows into a position where the input terminal Vi+ of the positive electrode is led out from the node NodeA1, does not cross with the secondary winding member W2 of the transformer T because the electric current (the input current) flows in a path that is substantially vertical to the secondary winding member W2. Therefore, the magnetic flux generated by the electric current (the input current) is not magnetically coupled with the secondary winding member W2.

Similarly, a circuit configuration of the second primary side closed circuit 32 also starts at the positive potential side of the capacitor C2, continues through the terminal p− of the transformer T, the terminal p+ after passing through the primary winding 11, the low side switch Q2, and the node NodeB1 that forms a part of the conductor 23, in this order, and goes back to the positive potential side of the capacitor C1. The substantial primary winding member W1 of the transformer T is formed with the capacitor C2, the low side switch Q2 and the primary winding 11 explained above. That is, in the present embodiment, as the configuration, the capacitor C2 and the low side switch Q2 are inserted in and connected to the primary winding member W1 of the transformer T. The input terminal Vi− of the negative electrode is led out from the node NodeB1 of the conductor 23 that is contained in the substantial winding structure.

When the magnetic flux Φb1 generated by the electric current Fb1 that flows in the second primary side closed circuit 32 crosses with the secondary winding member W2 of the transformer T, the magnetic flux Φb1 is magnetically coupled with the secondary winding member W2. On the other hand, the magnetic flux generated by an input current, which flows into a position where the input terminal Vi− of the negative electrode is led out from the node NodeB1, does not cross with the secondary winding member W2 of the transformer T because the electric current (the input current) flows in a path that is substantially vertical to the secondary winding member W2. Therefore, the magnetic flux generated by the electric current (the input current) is not magnetically coupled with the secondary winding member W2.

Because the first primary side closed circuit 31 and the second primary side closed circuit 32 are configured as explained above, the magnetic fluxes Φa1 and Φb1 that are generated in the first primary side closed circuit 31 and the second primary side closed circuit 32 are magnetically coupled with the secondary winding member W2. Therefore, the electric power can be transferred from the primary side to the secondary side of the transformer T.

The first primary side closed circuit 31 and the second primary side closed circuit 32 have the primary winding 11 in common and correspond to the closed circuits that respectively pass through two different elements from the terminal p+ of the winding start position to the terminal p− of the winding end position of the primary winding 11. In the first primary side closed circuit 31, the high side switch Q1 and the capacitor C1 are located on the part surface 21A of the board 21. In the second primary side closed circuit 32, the low side switch Q2 and the capacitor C2 are located on the solder surface 21B of the board 21. Further, the capacitor C1 and the high side switch Q1 are connected by the node NodeA1 on the part surface 21A of the board 21 and the input terminal Vi+ is led out therefrom. The capacitor C2 and the low side switch Q2 are connected by the node NodeB1 on the solder surface 21B of the board 21 and the input terminal Vi− is led out therefrom.

In the present embodiment, the secondary side circuit explained above is configured with a first secondary side closed circuit 41 and a second secondary side closed circuit 42. Specifically, the first secondary side closed circuit 41 is configured with the high side switch Q3 that corresponds to a first secondary side element, the low side switch Q6 that corresponds to a fourth secondary side element, the secondary winding 12 of the transformer T and the output capacitor Co. The second secondary side closed circuit 42 is configured with the high side switch Q5 that corresponds to a second secondary side element, the low side switch Q4 that corresponds to a third secondary side element, the secondary winding 12 of the transformer T and the output capacitor Co.

A circuit configuration of the first secondary side closed circuit 41 starts at the terminal s+ of the secondary winding 12 of the transformer T, continues through the high side switch Q3, the node NodeA2, the output capacitor Co and the output terminal Vo+, the output capacitor Co and the output terminal Vo−, the node NodeB2, and the low side switch Q6, reaches the terminal s− of the secondary winding 12, passes through the secondary winding 12 from the terminal s− and goes back to the terminal s+. The substantial secondary winding member W2 of the transformer T is formed with the high side switch Q3, the low side switch Q6 and the secondary winding 12. That is, in the present embodiment, as the configuration, the high side switch Q3 and the low side switch Q6 are inserted in and connected to the secondary winding member W2 of the transformer T. The output terminal Vo+ of the positive electrode and the output terminal Vo− of the negative electrode are respectively led out from the Nodes A2 and B2 that is contained in the secondary winding member W2. Further, the output capacitor Co is connected between the output terminals Vo+ and Vo−. The first secondary side closed circuit 41 is formed containing the above explained elements. The first secondary side closed circuit 41 is magnetically coupled with the magnetic flux Φa1 generated by the electric current Fa1 that flows in the primary winding member W1.

Similarly, a circuit configuration of the second secondary side closed circuit 42 also starts at the terminal s− of the secondary winding 12 of the transformer T, continues through the high side switch Q5, the node NodeA2, the output capacitor Co and output terminal Vo+, the output capacitor Co and the output terminal Vo−, the node NodeB2, and the low side switch Q4 after, reaches the terminal s+ of the secondary winding 12, passes through the secondary winding 12 from the terminal s+ and goes back to the terminal s− after passing through the secondary winding 12. The substantial secondary winding member W2 of the transformer T is formed with the high side switch Q5, low side switch Q4 and the secondary winding 12 explained above. That is, in the present embodiment, as the configuration, the high side switch Q5 and the low side switch Q4 are inserted in and connected to the secondary winding member W2 of the transformer T. The output terminal Vo+ of the positive electrode and the output terminal Vo− of the negative electrode are led out from the nodes Nodes A2 and B2 that is contained in the secondary winding member W2. Further, the output capacitor Co is connected between the output terminals Vo+ and Vo−. The second secondary side closed circuit 42 is formed containing the above explained elements. The second secondary side closed circuit 42 is magnetically coupled with the magnetic flux Φb1 generated by the electric current Fb1 that flows in the primary winding member W1. On the other hand, the magnetic flux of the output current that flows out from the output terminal Vo+ at a position where the output terminal Vo+ of the positive electrode is led from the node NodeA2 of the first conductor 23A and the magnetic flux of the output current that flows in from the output terminal Vo− at a position where the output terminal Vo− of the negative electrode is lead from the node NodeB2 of the third conductor 23C do not cross with the primary winding 11. Therefore, the magnetic fluxes of the electric currents explained above are not magnetically coupled with the primary winding member W1.

Because the first secondary side closed circuit 41 and the second secondary side closed circuit 42 are configured as explained above, the first secondary side closed circuit 41 and the second secondary side closed circuit 42 are magnetically coupled with the magnetic fluxes Φa1 and Φb1 that are generated by the electric currents Fa1 and Fb1 that flow in the primary winding member W1. Therefore, the electric power can be transferred from the primary side to the secondary side of the transformer T.

The first secondary side closed circuit 41 and the second secondary side closed circuit 42 have the secondary winding 12 and the output capacitor Co in common and correspond to the closed circuits that respectively pass through two different switching elements from the terminal s+ of the winding start position to the terminal s− of the winding end position of the secondary winding 12. In the first secondary side closed circuit 41, the high side switch Q3 is located on the part surface 21A of the board 21. The low side switch Q6 is located on the solder surface 21B of the board 21. In the second secondary side closed circuit 42, the high side switch Q5 is located on the part surface 21A of the board 21. The low side switch Q4 is located on the solder surface 21B of the board 21. Further, the output capacitor Co is located on the part surface 21A of the board 21. The positive potential side of the output capacitor Co is connected to the node NodeA2 of the first conductor 23A. On the other hand, the negative potential side of the output capacitor Co is connected to the node NodeB2 of the third conductor 23C via a through hole 24F that penetrates the board 21.

Further, the two high side switches Q3 and Q5 are connected by the node NodeA2 on the part surface 21A of the board 21 and the output terminal Vo+ is led out. The two low side switches Q4 and Q6 are connected by the node NodeB2 on the solder surface 21B of the board 21 and the output terminal Vo− is let out. In the two closed circuits, the electric current respectively flows also between the output terminal Vo+ and the output terminal Vo− via the output capacitor Co.

Figure 5A:
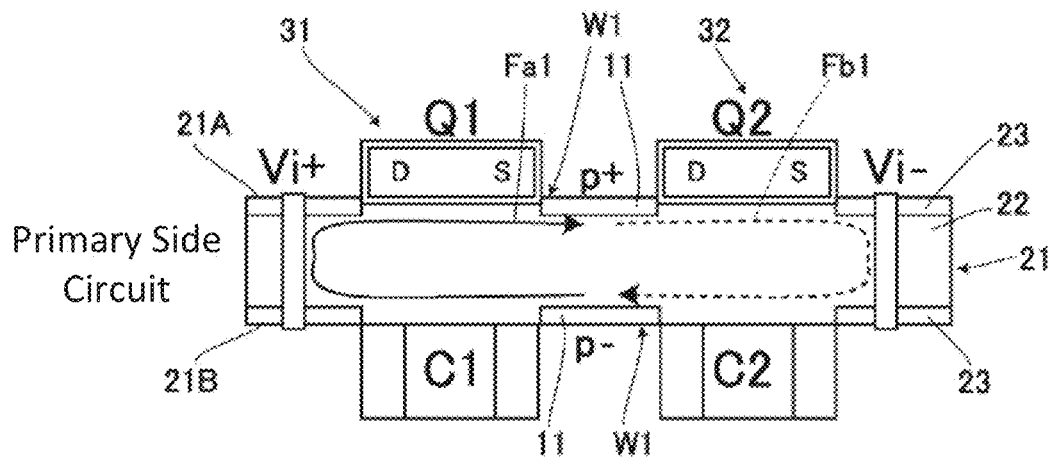
FIGS. 5A and 5B are cross sectional views showing parts arrangement of a primary side circuit and a secondary side circuit, respectively, of a conventional DC-DC converter.
Figure 5B:
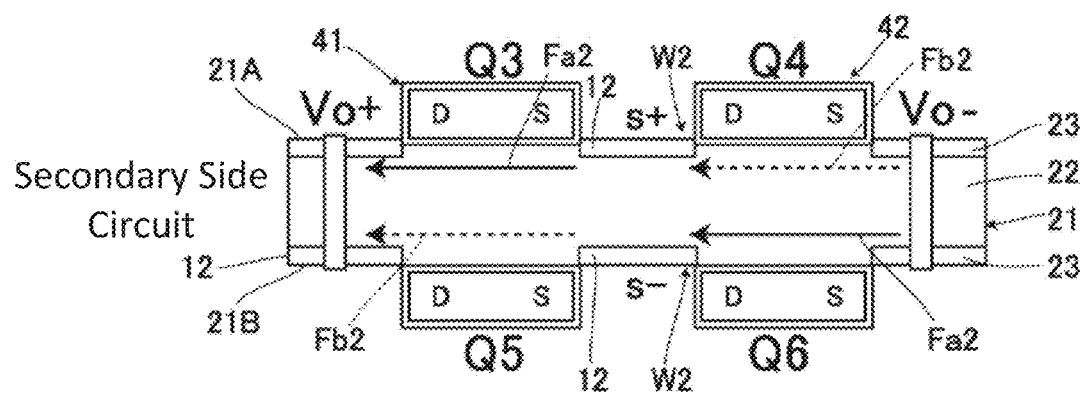
Figure 6:
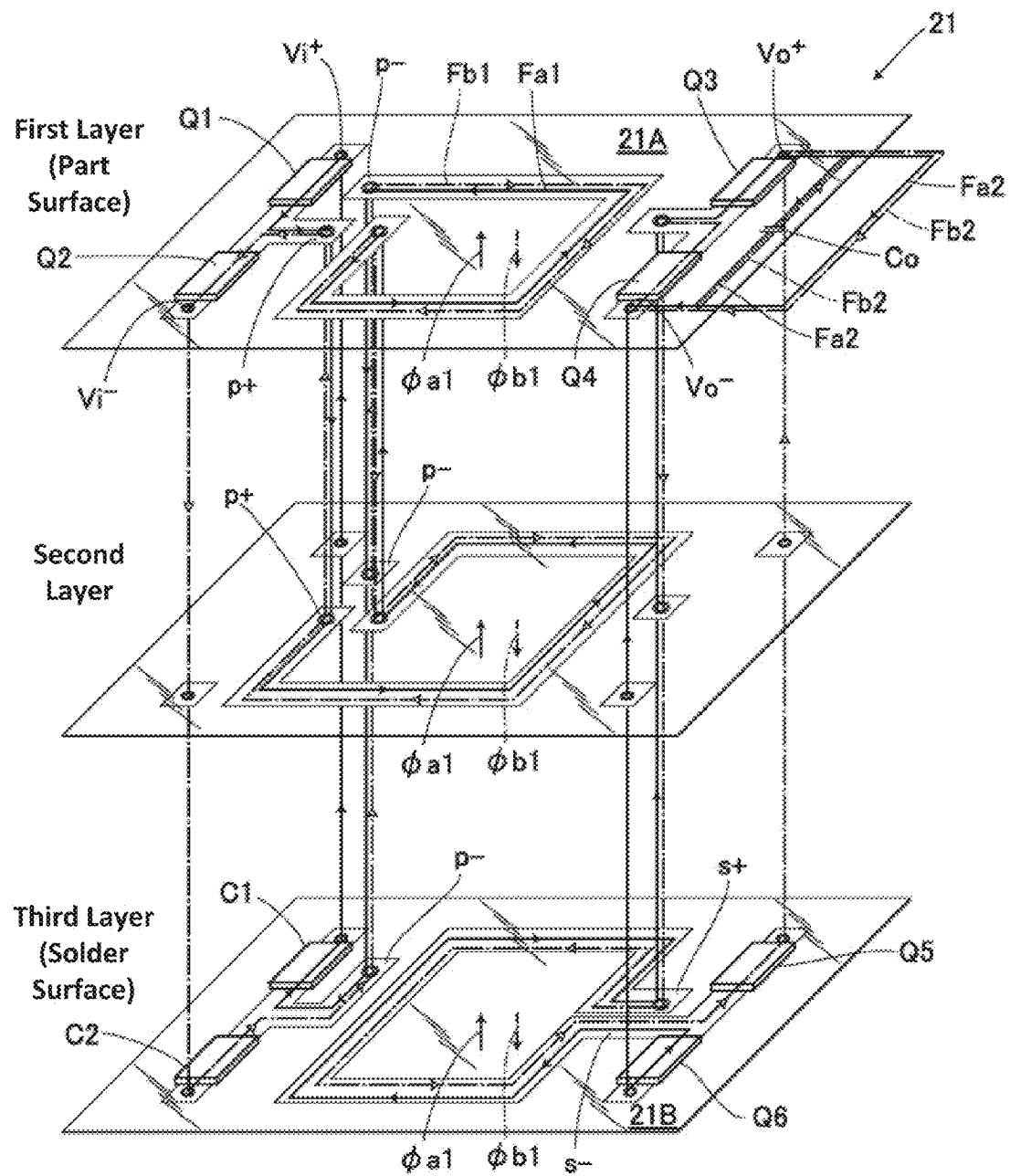
FIG. 6 is a perspective view that shows an arrangement relationship between conductors and each of elements of a conventional DC-DC converter.

Conventional Parts arrangement of a primary side circuit and a secondary side circuit of a DC-DC converter 1 is shown in FIGS. 5A-5B to compare with FIGS. 2A-2B. Further, as a comparison with FIG. 4, FIG. 6 is a perspective view that shows a conventional arrangement relationship between a conductor 23 and each element of a DC-DC converter 1 as seen from a first layer through the second and third layers.

As shown in FIGS. 5A-5B, in the conventional primary side circuit, a high side switch Q1 and a low side switch Q2 are located on a part surface 21A of a board 21. Capacitors C1 and C2 are located on a solder surface 21B of a board 21. Further, a terminal p+ of a winding start position of a primary winding 11 is located between the switches Q1 and Q2. A terminal p− of a winding end position of the primary winding 11 is located between the capacitors C1 and C2. Therefore, a conventional primary winding member W1 of a transformer T does not substantially include the switches Q1, Q2 and the capacitors C1, C2 (they are not inserted in the primary winding member W1). The conventional primary winding member W1 is formed before the conventional primary winding member W1 is connected to the switches Q1, Q2 and the capacitors C1, C2.

Further, in a conventional secondary side circuit, a high side switch Q3 and a low side switch Q4 are located on the part surface 21A of the board 21. A high side switch Q5 and a low side switch Q6 are located on the solder surface 21B of the board 21. Further, a terminal s+ of the winding start position of the secondary winding 12 is located between the switches Q3 and Q4. A terminal s− of the winding end position of the secondary winding 12 is located between the switches Q5 and Q6. Therefore, a conventional secondary winding member W2 of the transformer T does not substantially include the switches Q3, Q4, Q5 and Q6 (they are not inserted in the secondary winding member W2). The conventional secondary winding member W2 is formed before the conventional secondary winding member W2 is connected to the switches Q3, Q4, Q5 and Q6.

Figure 7:
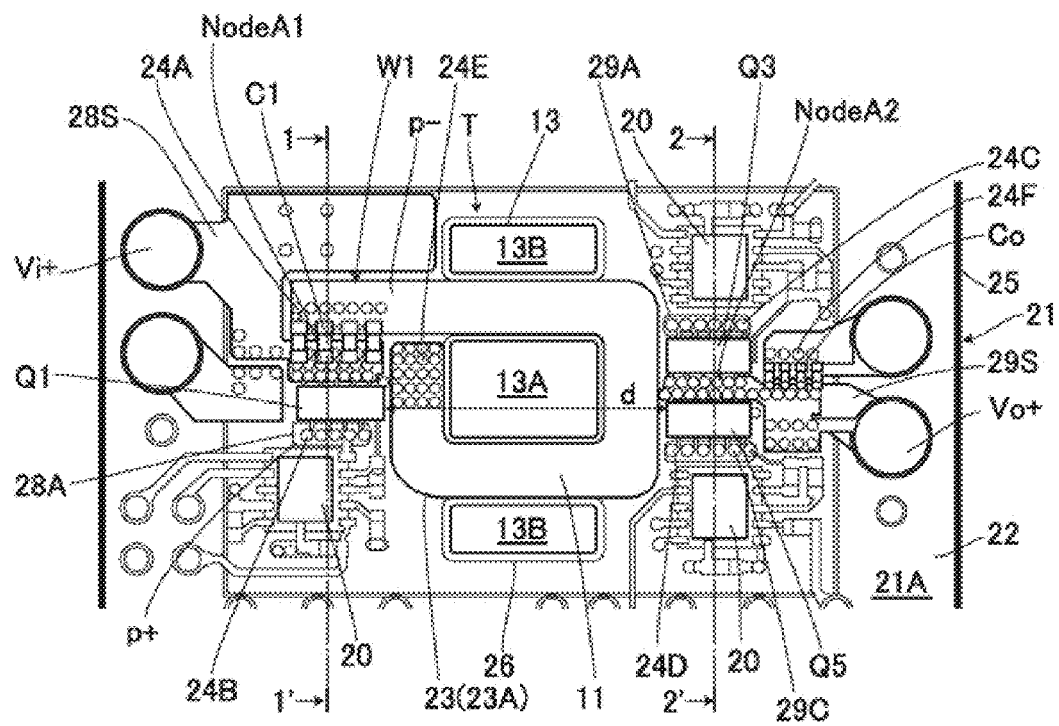
FIG. 7 is a plan view that shows a first layer of a board of a DC-DC converter according to an embodiment of the present invention.
Figure 8:
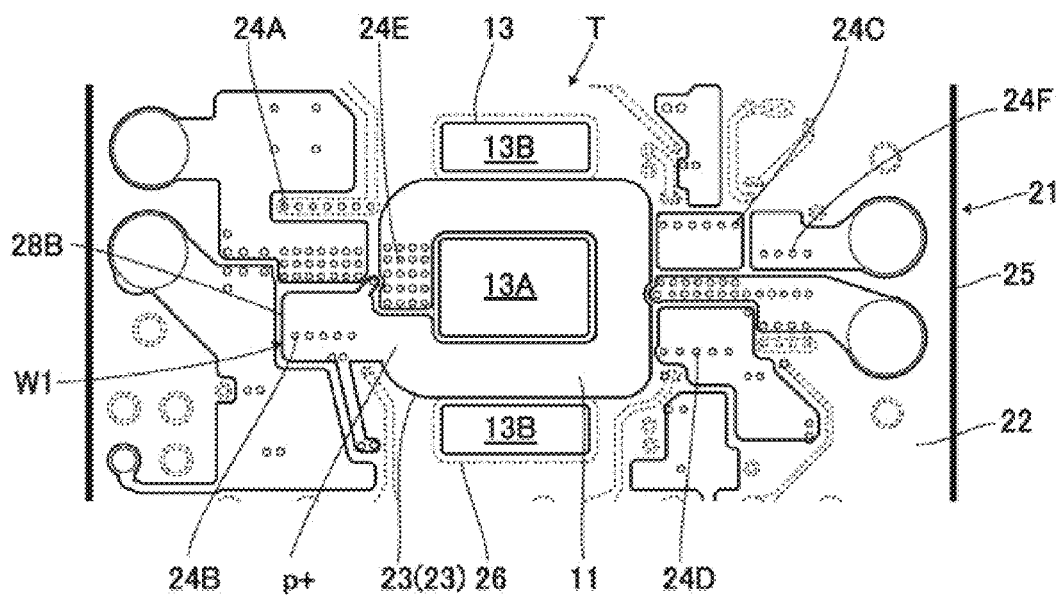
FIG. 8 is a plan view that shows a second layer of the board of the DC-DC converter according to an embodiment of the present invention.
Figure 9:
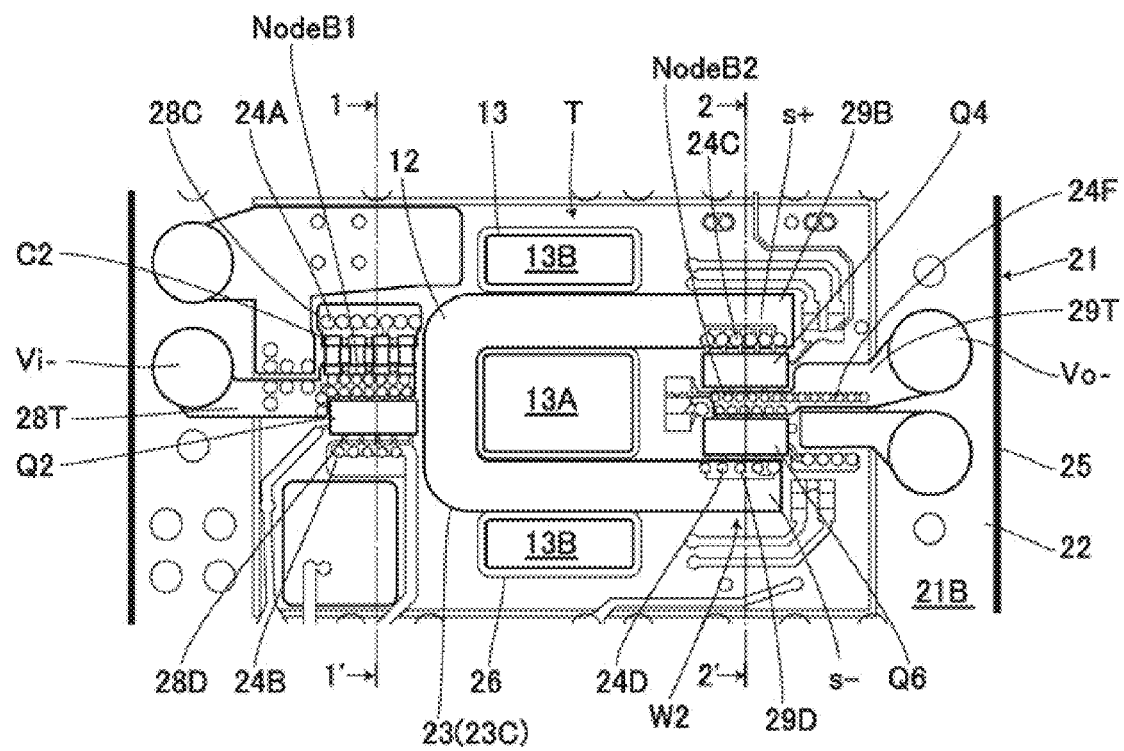
FIG. 9 is a bottom view that shows a third layer of the board of the DC-DC converter according to an embodiment of the present invention.

FIGS. 7-9 show pattern layout views of the board 21 of the DC-DC converter 1 according to the present embodiment. FIGS. 7-9 are wiring pattern layout views that more specifically show the circuit configurations shown in FIG. 4 and are seen from the first layer of the board 21 with transparent second and third layers. The board 21 has a multilayer structure in which wiring bodies 25s that are formed in a plurality of plate shapes are laminated. Each wiring body 25 is configured with the conductor 23 that is patterned on the surface of the insulating base 22. Though three layers that correspond to the conductors 23A-23C are provided in the present embodiment, the number of layers is not particularly limited.

As shown in FIGS. 4 and 7 through 9, in the present embodiment, the high side switches Q3, Q5 and the low side switches Q4, Q6 are incorporated in (integrated with) the secondary winding member W2 that circulates around the magnetic core 13 of the transformer T. That is, the transformer T and the switches Q3-Q6 can be located as close as possible in distance.

On the other hand, as shown in FIGS. 6 and 10 through 12, in the conventional technology, the high side switches Q3, Q5 and the low side switches Q4, Q6 are not incorporated in (integrated with) the secondary winding member W2 that circulates around the magnetic core 13 of the transformer T. That is, because the secondary winding member W2 is interposed between the magnetic core 13 and the switches Q3-Q6, the transformer T and the switches Q3-Q6 cannot be closely located in distance. The above situation can be applied to the primary side circuit.

FIG. 7 is a plan view of the first layer that corresponds to an outer layer as the part surface of the board 21 seen from a side of the part surface 21A of the board 21 that is exposed. FIG. 8 is a perspective view of the second layer that corresponds to an inner layer of the board 21 as transmitted from the part surface 21A of the board 21. FIG. 9 is a perspective view of the third layer that corresponds to an outer layer as the solder surface 21B of the board 21 as transmitted from the part surface 21A of the board 21 that is exposed.

The magnetic core 13 of the transformer T is configured with a central leg part 13A and side leg parts 13B of an E type core member, which are paired, are abutted against each other. The central leg part 13A and the side leg parts 13B are respectively inserted in a through hole 26 that is formed in the board 21. On the first layer that corresponds to the outer layer as the part surface 21A of the board 21, the high side switch Q1 and the capacitor C1 that configure the primary side circuit, and the high side switches Q3 and Q5 that configure the secondary side circuit are respectively mounted. Further, on the first layer of the board 21, a driver circuit 20, etc. explained above is mounted. On the third layer that corresponds to the outer layer as the solder surface 21B of the board 21, the low side switch Q2 and the capacitor C2 that configure the primary side circuit are respectively mounted. Further, the low side switches Q4 and Q6 that configure the secondary side circuit are also respectively mounted on the third layer.

Next, the primary side closed circuit and the secondary side closed circuit are explained with reference to the plan views shown in FIG. 7-9. A circuit configuration of the first primary side closed circuit 31, in the first layer of the board 21 shown in FIG. 7, starts at the node NodeA1 of the first conductor 23A, continues through the high side switch Q1 and the terminal p+ of the primary winding 11, passes through the through hole 24B that penetrates the front and the back of the board 21 from a pattern portion 28A of the terminal p+, reaches a pattern portion 28B in the second layer of the board 21 shown in FIG. 8, circulates around the primary winding 11 (one turn) in a rectangular shape that surrounds the central leg part 13A of the magnetic core 13 in the second layer, reaches the first layer after passing through IVH through holes 24E that penetrates the front and the back of the board 21, circulates around the primary winding 11 (one turn) in the rectangular shape that surrounds the central leg part 13A of the magnetic core 13 in the first layer, passes through the terminal p− of the primary winding 11 and the capacitor C1, and goes back to the node NodeA1. The primary winding member W1 of the transformer T that substantially has two turns is formed with the capacitor C1, the high side switch Q1 and the primary winding 11 explained above. A pattern portion 28S of the first conductor 23A that branches out from the node NodeA1 in the middle of the first primary side closed circuit 31 is formed. Further, the input terminal Vi+ of the positive electrode that is electrically connected to the pattern portion 28S is led out from the node NodeA1.

Similarly, a circuit configuration of the second primary side closed circuit 32, in the third layer of the board 21 shown in FIG. 9, starts at the capacitor C2, continues through a patter portion 28C, reaches the terminal p− of the primary winding 11 in the first layer of the board 21 shown in FIG. 7 after passing through the through hole 24A, circulates around the primary winding 11 (one turn) in the rectangular shape that surrounds the central leg part 13A of the magnetic core 13 in the first layer, reaches the second layer of the board 21 shown in FIG. 8 after passing through the IVH through holes 24E, circulates around the primary winding 11 (one turn) in the rectangular shape that surrounds the central leg part 13A of the magnetic core 13 in the second layer, reaches the pattern portion 28B, continues through the through hole 24B, a pattern portion 28D in the third layer of the board 21, the low side switch Q2 and the node NodeB1 of the third conductor 23C, and goes back to the capacitor C2. The primary winding member W1 of the transformer T that substantially has two turns is formed with the capacitor C2, the low side switch Q2 and the primary winding 11 explained above. Further, a pattern portion 28T of the third conductor 23C that branches out from the node NodeB1 in the middle of the second primary side closed circuit 32 is formed. Further, the input terminal Vi− of the negative electrode that is electrically connected to the pattern portion 28T is led out from the node NodeB1.

A circuit the configuration of the first secondary side closed circuit 41, in the first layer of the board 21 shown in FIG. 7, starts at the terminal s+ of the secondary winding 12 of the transformer T, heads to the output capacitor Co and the output terminal Vo+ after passing through the pattern portion 29A of the terminal s+, the high side switch Q3 and the node NodeA2 in this order, goes back to the node NodeB2 from the output capacitor Co and the output terminal Vo− in the third layer of the board 21 shown in FIG. 9, passes through the low side switch Q6, reaches the terminal s− of the secondary winding 12, passes through the secondary winding 12 in a U shape that surrounds the central leg part 13A of the magnetic core 13, and goes back to the terminal s+. The secondary winding member W2 of the transformer T that substantially has one turn is formed with the high side switch Q3, the low side switch Q6 and the secondary winding 12 explained above. Further, a pattern portion 29S of the first conductor 23A that branches out from the node NodeA2 in the middle of the first secondary side closed circuit 41 is formed. Further, the output terminal Vo+ of the positive electrode that is electrically connected to the pattern portion 29S is led out from the node NodeA2. At the same time, in the node NodeB2 that is in the middle of the first secondary side closed circuit 41, a pattern portion 29T of the third conductor 23C that branches out from the secondary winding member W2 is formed. Further, the output terminal Vo− of the negative electrode that is electrically connected to the pattern portion 29T is lead out.

Similarly, a circuit configuration of the second secondary side closed circuit 42, in the first layer of the board 21 shown in FIG. 7, starts at the terminal s− of the secondary winding 12 of the transformer T, heads to the output capacitor Co and the output terminal Vo+ after passing through a pattern portion 29C of the terminal s−, the high side switch Q5 and the node NodeA2 in this order, goes back to the node NodeB2 from the output capacitor Co and the output terminal Vo− in the third layer of the board 21 shown in FIG. 9, passes through the low side switch Q4, reaches the terminal s+ of the secondary winding 12, passes through the secondary winding 12 in a U shape that surrounds the central leg part 13A of the magnetic core 13, and goes back to the terminal s−. The secondary winding member W2 of the transformer T that substantially has one turn is formed with the low side switch Q4, the high side switch Q5 and the secondary winding 12 explained above. Further, the pattern portion 29S of the first conductor 23A that branches out from the node NodeA2 in the middle of the second secondary side closed circuit 42 is formed. Further, the output terminal Vo+ of the positive electrode that is electrically connected to the pattern portion 29S is led out from the node NodeA2. At the same time, the pattern portion 29T of the third conductor 23C that branches out from the node NodeB2 in the middle of the second secondary side closed circuit 42 is formed. Further, the output terminal Vo− of the negative electrode that is electrically connected to the pattern portion 29T is lead out.

The wiring bodies 25 that configure the board 21 in the present embodiment are laminated with the conductors 23 from the first layer to the third layer in this order. With respect to the primary winding member W1 of the transformer T, the primary winding 11 of one turn that is formed in the conductor 23A that corresponds to the first layer and the primary winding 11 of one turn that is formed in the conductor 23B that corresponds to the second layer are connected in series by the IVH through holes 24E. Thus, the primary winding 11, which is common for the first primary side closed circuit 31 and the second primary side closed circuit 32, is provided in the wiring body 25. Further, with respect to the secondary winging W2 of the transformer T, the secondary winding 12 that has the U shape is formed in the wiring body 25 in the third layer. The secondary winding 12 is connected to the through holes 24C and 24D. Therefore, the secondary winding 12 explained above is common for the first secondary side closed circuit 41 or the second secondary side closed circuit 42.

The primary winding member W1 of the transformer T contains the switches Q1 and Q2 that are semiconductors, the capacitors C1 and C2 that are dielectrics, and the conductor 23. Further, because the magnetic fluxes Φa1 and Φb1 generated by the electric currents Fa1 and Fb1 that flow in the primary winding member W1 are magnetically coupled with the secondary winding member W2, the electric power is transferred from the primary side to the secondary side of the DC-DC converter. For instance, as discussed in the present embodiment, when the primary winding member W1 has two turns, the primary winding member W1 with two turns can be configured with the pattern portions 28A, 28B, 28C and 28D, the nodes NodeA1, NodeB1, and the primary winding 11 that are formed in the first layer and the second layer of the board 21. Specifically, the pattern portions 28A, 28B, 28C and 28D are the conductors 23 that incorporate the switches Q1 and Q2 and the capacitors C1 and C2.

Similarly, the secondary winding member W2 of the transformer T contains the high side switches Q3, Q5 and the low side switches Q4, Q6, which are semiconductors, and the conductors 23. Further, because the magnetic fluxes Φa1 and Φb1 generated by the electric currents Fa1 and Fb1 that flows in the primary winding member W1 are magnetically coupled with the secondary winding member W2, the electric power is transferred from the primary side to the secondary side of the DC-DC converter. For instance, as discussed in the present embodiment, when the secondary winding member W2 has one turn, the secondary winding member W2 with one turn can be configured with the pattern portions 29A, 29B, 29C and 29D, the nodes NodeA2, NodeB2, and the secondary winding 12 that are formed in the third layer of the board 21 in the U shape. Specifically, the pattern portions 29A, 29B, 29C and 29D are the conductors 23 that incorporate the high side switches Q3, Q5 and the low side switches Q4, Q6.

Figure 10:
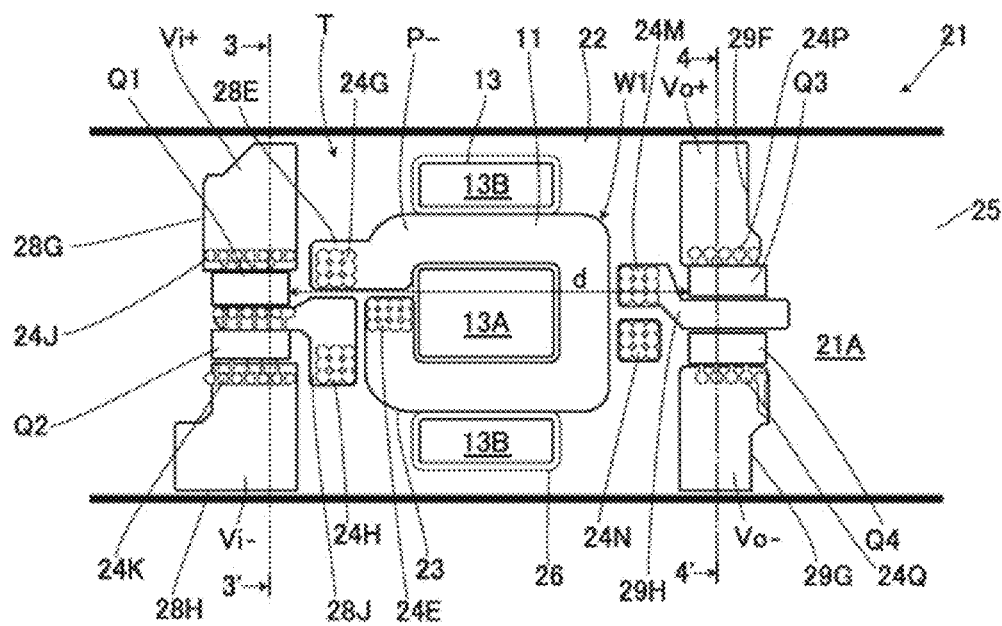
FIG. 10 is a plan view that shows a first layer of a board of a conventional DC-DC converter.
Figure 11:
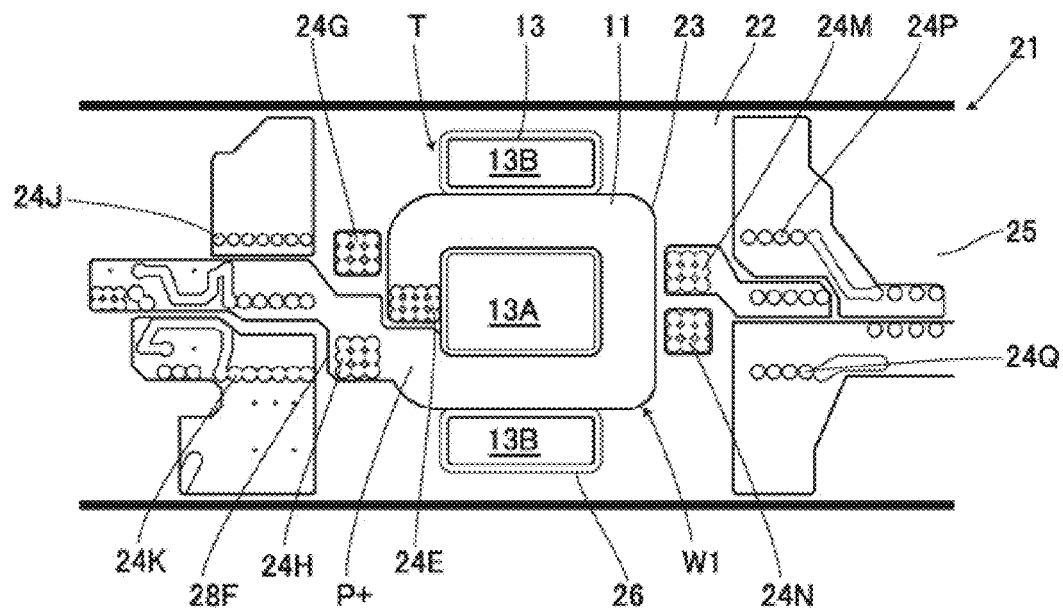
FIG. 11 is a plan view that shows a second layer of the board of the conventional DC-DC converter.
Figure 12:
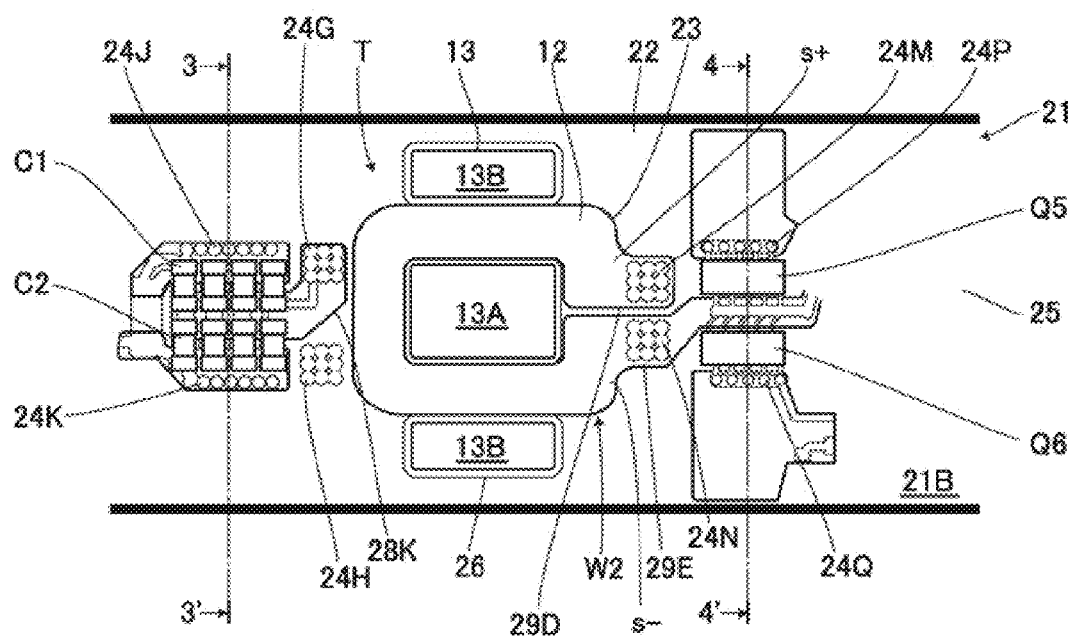
FIG. 12 is a bottom view that shows a third layer of the board of the conventional DC-DC converter.

FIGS. 10-12 that show a conventional technology respectively correspond to FIGS. 7-9 of the present embodiments. FIGS. 10-12 show pattern layout views of a board 21 in the conventional DC-DC converter. In the conventional technology, as a primary side circuit of a transformer T, the switches Q1 and Q2 are mounted on a first layer of the board 21 and the capacitors C1 and C2 are mounted on a third layer of the board 21. The positions of the switches Q1, Q2 and the capacitors C1, C2 mentioned above are different from the positions of the present embodiment. Here, in the first layer and the second layer of the board 21, the primary winding 11 that has two turns is formed. A pattern portion 28E that is electrically connected to the other terminal p− (a through hole 24G) of the primary winding 11 is extended. Further, a pattern portion 28F that is electrically connected to one terminal p+ (a through hole 24H) of the primary winding 11 is extended. Further, pattern portions 28G, 28H and 28J are respectively provided at the first layer of the board 21. Specifically, the pattern portion 28G is led out from a drain D of the high side switch Q1 to an input terminal Vi+ of a positive electrode and is connected to a positive electrode of the capacitor C1 that is mounted on the third layer of the board 21 via a through hole 24J. The pattern portion 28H is led out from a source S of the low side switch Q2 to an input terminal Vi− of a negative electrode and is connected to a negative electrode of the capacitor C2 that is mounted on the third layer of the board 21 via a through hole 24K. The pattern portion 28J is connected to a source S of the high side switch Q1 and a drain D of the low side switch Q2 and is led out from there to the transformer T. Further, the pattern portion 28J is connected to the one terminal p+ of the primary winding 11 that is provided in the second layer of the board 21 via a through hole 24H. Further, a pattern portion 28K is provided in the third layer of the board 21. Specifically, the pattern portion 28K is connected to a negative electrode of the capacitor C1 and a positive electrode of the capacitor C2 and is led out to the primary winding 11 and is connected to the other terminal p− of the primary winding 11 that is provided on the first layer of the board 21 via the through hole 24G.

Further, as a secondary side circuit of the conventional transformer T, the switches Q3 and Q4 are mounted on the first layer of the board 21 and the switches Q5 and Q6 are mounted on the third layer of the board 21. The positions of the switches Q4 and Q5 are reversed between the conventional technology and the present embodiment. Here, in the wiring body 25 of the third layer of the board 21, the secondary winding 12 that has one turn is formed. A pattern portion 29D that is electrically connected to a through hole 24M is extended at the one terminal s+ of the secondary winding 12. A pattern portion 29E that is electrically connected to a through hole 24N is extended at the other terminal s− of the secondary winding 12. Further, pattern portions 29F, 29G and 29H are respectively provided at the first layer of the board 21. Specifically, the pattern portion 29F is led out from the drain D of the high side switch Q3 to the output terminal Vo+ of the positive electrode and is connected to the drain D of the low side switch Q5 that is mounted on the third layer of the board 21 via a through hole 24P. The pattern portion 29G is led out from the source S of the low side switch Q4 to the output terminal Vo− of the negative electrode and is connected to the source S of the low side switch Q6 that is mounted on the third layer of the board 21 via a through hole 24Q. The pattern portion 29H is connected to the source S of the high side switch Q3 and the drain D of the low side switch Q4 and is led out from there to the transformer T. Further, the pattern portion 29H is connected to the one terminal s+ of the secondary winding 12 that is provided in the third layer of the board 21 via the through hole 24M.

The switches Q1, Q2 and the capacitors C1, C2 are not incorporated in (integrated with) the primary winding member W1 of the transformer T in the conventional primary side circuit of the transformer T in the conventional technology. Further, the pattern portions 28E, 28F, 28K and 28J that correspond to connecting areas are provided between the transformer T and the switches Q1, Q2 and the capacitors C1, C2 as mentioned above. Similarly, in the conventional secondary side circuit of the transformer T, the switches Q3, Q4, Q5 and Q6 are not incorporated in (integrated with) the secondary winding member W2 of the transformer T. Further, the pattern portions 29D, 29E and 29H that correspond to connecting areas are provided between the transformer T and the switches Q3, Q4, Q5 and Q6 as mentioned above. In contrast, in the present embodiment, because the connecting areas explained above do not exist, the distance between the parts can be shortened and the area on which the DC-DC converter is mounted on the board 21 can decrease. In fact, a conventional distance "d" between the switches Q1 and Q3 is to 22 mm (refer to FIG. 10) in the conventional technology while an embodiment distance "d" between the switches Q1 and Q5 in the present embodiment can be reduced to 14 mm (refer to FIG. 7).

As explained above, in the DC-DC converter 1 of the present embodiment shown in FIG. 1, the circuit topology, in which two circuits of the primary side closed circuits 31 and 32 in the primary side of the transformer T and two circuits of the secondary side closed circuits 41 and 42 in the secondary side of the transformer T are provided, is proposed. Thus, because the switches Q1, Q2 and the capacitors C1, C2 that correspond to the primary side elements are incorporated in (integrated with) the primary winding member W1 of the transformer T and the high side switches Q3, Q5 and the low side switches Q4, Q6 that correspond to the secondary side elements are incorporated in (integrated with) the secondary winding member W2 of the transformer T, it is realized that a mounting area of the board 21 for the DC-DC converter 1 becomes compact.

Specifically, in the present embodiment, the primary side circuit or the secondary side circuit has a half bridge configuration with the two FETs (the switches Q1 and Q2) and the two capacitors (C1 and C2) or has a full bridge configuration with the four FETs (the switches Q3-Q6). The transformer T corresponds to a so-called sheet transformer. The primary winding member W1 and the secondary winding member W2 of the transformer T are formed with the copper foil or the metal plate that both correspond to the conductors 23 configuring the board 21.

Further, the two elements of the high side switch Q1 and the capacitor C1 that are connected to the input terminal Vi+ of the positive electrode and the two elements of the high side switches Q3 and Q5 that are connected to the output terminal Vo+ of the positive electrode are mounted on the part surface 21A that corresponds to an upper surface of the board 21. Further, the input terminal Vi+ and the output terminal Vo+ of the positive electrode are led out from the nodes NodeA1 and NodeA2, which correspond to the connecting points of these two elements, by the pattern portions 28S and 29S. At the same time, the two elements of the low side switch Q2 and the capacitor C2 that are connected to the input terminal Vi− of the negative electrode and the two elements of the low side switches Q4 and Q6 that are connected to the output terminal Vo− of the negative electrode are mounted on the solder surface 21B that corresponds to a lower surface of the board 21. Further, the input terminal Vi− and the output terminal Vo− of the negative electrode are led out from the nodes NodeB1 and NodeB2, which correspond to the connecting points of these two elements, by the pattern portions 28T and 29T.

The switches Q1, Q2 and the capacitors C1, C2 of the primary side circuit are connected to each other by the first conductor 23A, the third conductor 23C and the two through holes 24A, 24B. Specifically, the first conductor 23A and the third conductor 23C are respectively patterned on the part surface 21A and the solder surface 21B of the board 21. The two through holes 24A and 24B connect the first and third conductors 23A and 23C. Further, the two connecting points of the through holes 24A, 24B and the primary winding 11 are connected to configure the primary winding member W1 of the transformer T. At the same time, four elements (Q3-Q6) of the secondary side circuit are connected by the first conductor 23A, the third conductor 23C and the two through holes 24C, 24D. Specifically, the first conductor 23A and the third conductor 23C are respectively patterned on the part surface 21A and the solder surface 21B of the board 21. The two through holes 24C and 24D connect the first and third conductors 23A and 23C. Further, the two connecting points of the through holes 24C, 24D and the secondary winding 12 are connected to configure the secondary winding member W2 of the transformer T.

Next, experiments for the switches Q3-Q6 and preferred configurations are explained below. The switches Q3-Q6 in the experiments have the same properties/specifications.

In general, when a primary winding member made by a pattern of a copper foil (a copper pattern) and a secondary winding member made by a pattern of a copper foil (a copper pattern) are formed next to each other in parallel and when the primary winding member is magnetically coupled with the secondary winding member by magnetic flux, which is generated by a flow of a primary current, a proximity effect occurs because an electric current flows in both of the primary winding member and the secondary winding member. As a result, deviation of electric current that respectively flows in the copper patterns occurs. Because of the deviation of the electric current, most of the electric current flows only in a partial area of the copper pattern and a winding loss increases. In the present embodiments, the secondary winding member W2 of the transformer T is configured with the secondary winding 12, which has the copper pattern in the U shape, and the switches Q3-Q6 that are semiconductors. Further, because the electric current flowing inside of the switches Q3-Q6 is magnetically coupled with the magnetic fluxes Φa1 and Φb1 that are generated by the electric currents Fa1 and Fb1 of the primary winding member W1, the proximity effect occurs in the switches Q3-Q6 that are semiconductors in the same manner as the secondary winding 12 that is made of the copper pattern. Further, the deviation of the electric current inside of the switches Q3-Q6 occurs. Thus, when the most of the electric current flows only in a partial area, the losses of the switches Q3-Q6 significantly increase because an ON resistance of the switches Q3-Q6 is originally higher than the secondary winding 12 made by the copper pattern.

Figure 13A:
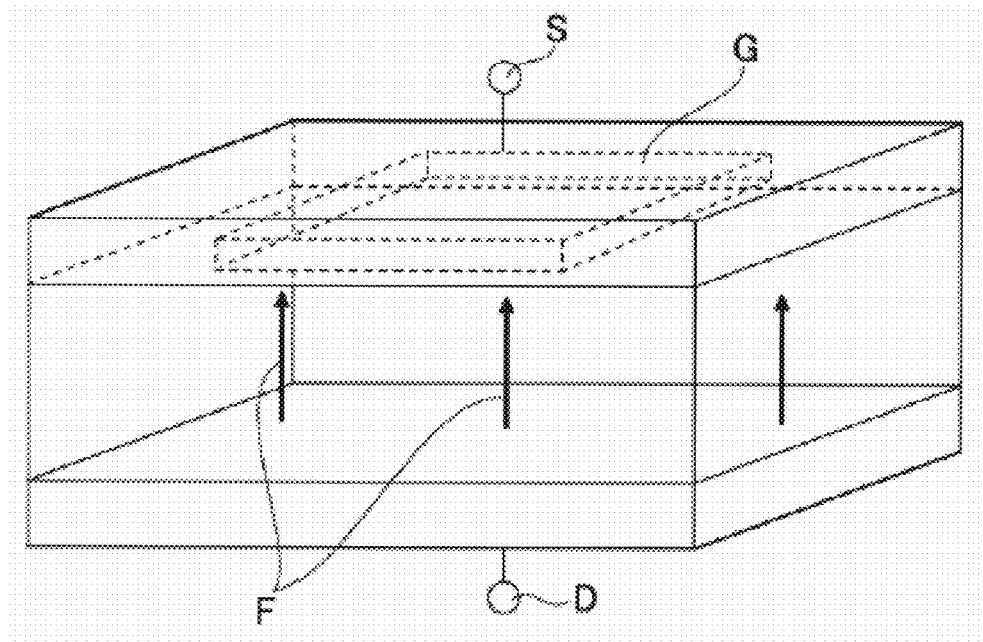
FIGS. 13A and 13B show schematic views of typical structures of FETs that are used as switches.
Figure 13B:
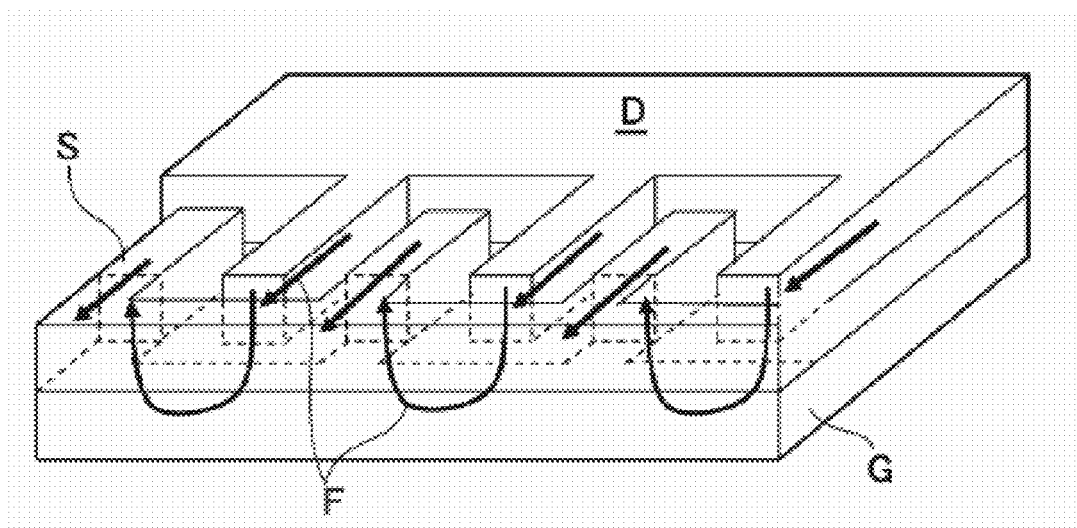

FIGS. 13A and 13B show schematic views of a typical structure of a MOSFET (Metal Oxide Semiconductor Field Effect Transistor) that is also used for the switches Q1 and Q2 in addition to the switches Q3-Q6. In FIGS. 13A and 13B, reference numerals D, S and G respectively shows positions of a drain, a source and a gate. Further, a reference numeral F shows flows of the electric current from the drain D to the source S when a voltage is applied to the gate G.

In a vertical-structure FET (a vertical FET) shown in FIG. 13A, the drain D and the source S are respectively formed in a flat plate shape. When the voltage is applied to the gate G, the electric current vertically flows between the drain D and the source S. The vertical-structure FET explained above has a configuration suitable for high breakdown voltage and low ON-resistance so that the vertical-structure FET is the best element for a switching element.

On the other hand, in a horizontal-structure FET (a horizontal FET) shown in FIG. 13B, the drain S and the source D are formed in a comb (teeth) shape in which they are alternately located. When the voltage is applied to the gate G, the electric current flows horizontally between the drain D and the source S. The horizontal-structure FET explained above has features in which a low capacity characteristics and a reverse transmission capacity (period capacity) are extremely small. For instance, a GaN (gallium nitride)-FET is configured by depositing the gallium nitride on a silicon substrate through an aluminum nitride insulating layer.

Figure 14:
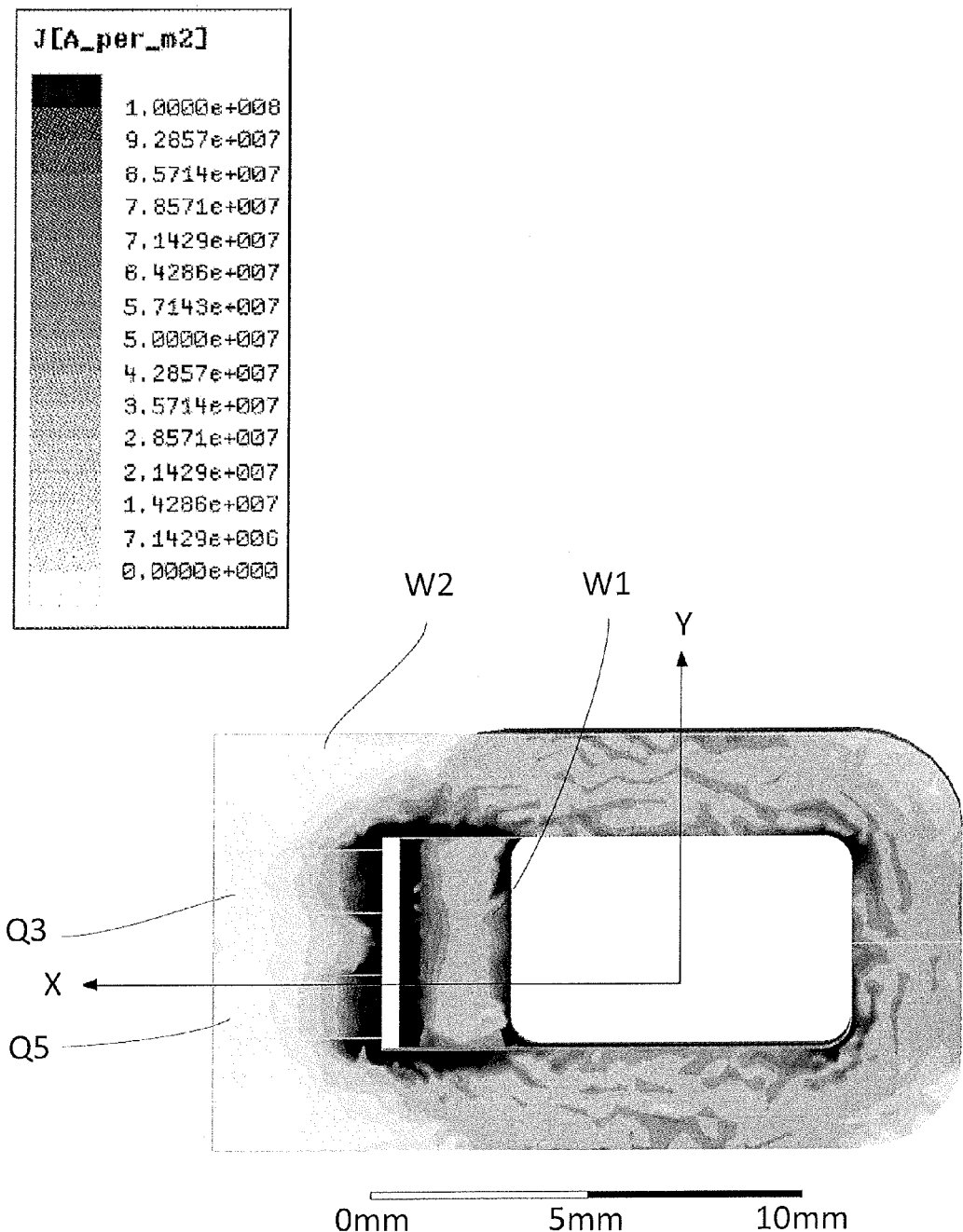
FIG. 14 is a diagram that shows a current density distribution when two horizontal-structure FETs are mounted in a secondary winding member of a transformer according to an embodiment of the present invention. Note that a tone of a black/white color represents a degree of loss in FIGS. 14-16 and 18-20. A deeper black color means a larger loss.

FIG. 14 is a diagram showing an electric current density distribution in a simple structure when an electric current flows in a closed circuit of the high side switches Q3 and Q5

(or the low side switches Q4 and Q6) formed as a horizontal FET. The high side switches Q3 and Q5 are incorporated in (integrated with) the secondary winding member W2 of the transformer T in accordance with the electric current that flows in the primary winding member of the transformer T. In FIG. 14, it is shown by the electric current distribution flowing in the winding members W1, W2 and each of the switches Q3 and Q5 that the switches Q3 and Q5 are located in areas adjacent to (next to) the windings. In the experiment, the conduction loss of the FET increases from 0.58 W to 1.35 W as compared with a case in which a direct current that is the same effective value flows in the FET. Note that a tone of a black/white color represents a degree of loss in FIGS. 14-16 and 18-20. A deeper black color means a larger loss.

Figure 15:
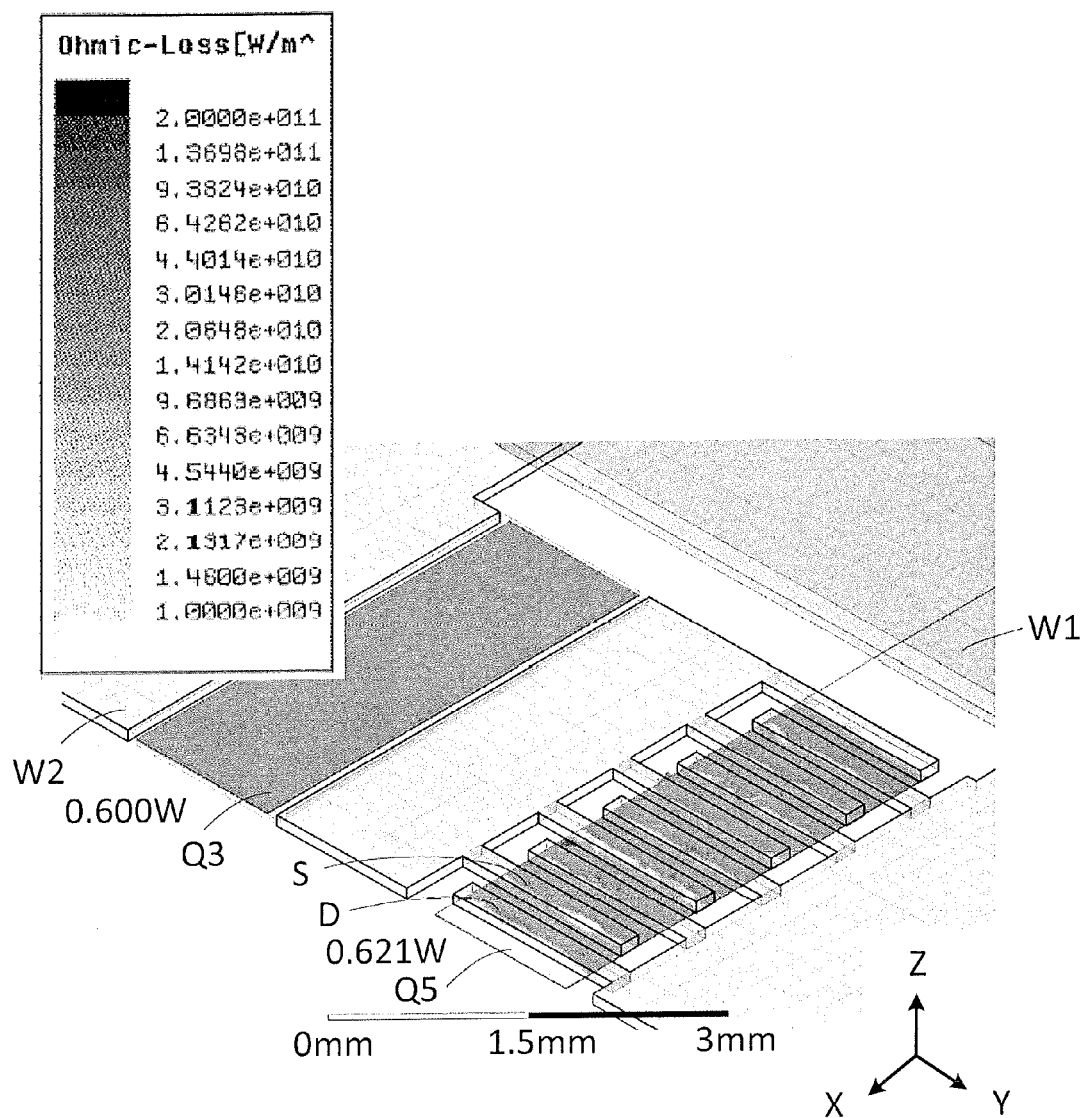
FIG. 15 is a diagram that shows a current density distribution when a vertical-structure FET and a horizontal-structure FET are mounted in a secondary winding member of a transformer under a condition in which a switching frequency corresponds to 1 Hz according to an embodiment of the present invention.
Figure 16:
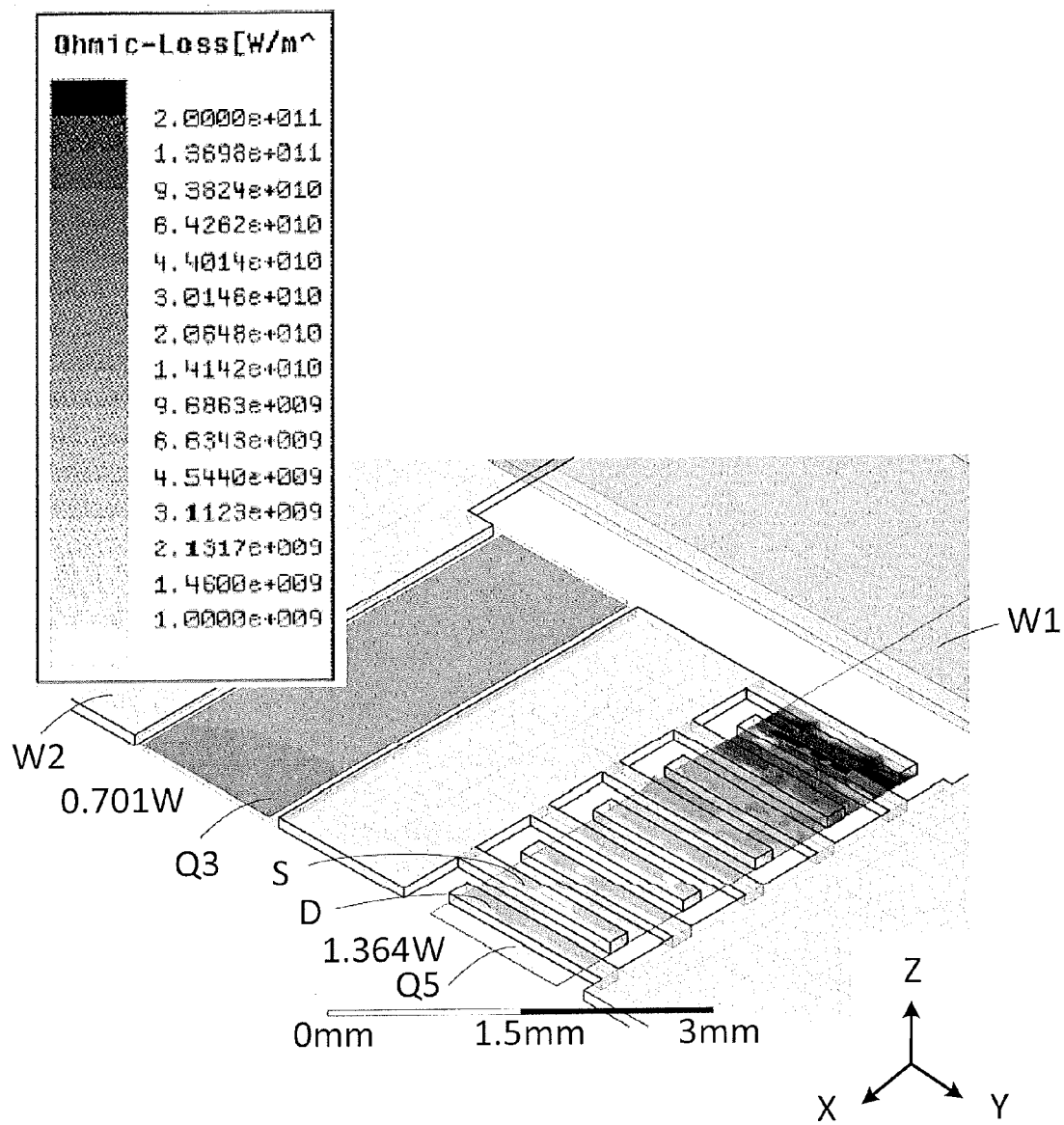
FIG. 16 is a diagram that shows a current density distribution when a vertical-structure FET and a horizontal-structure FET are mounted in a secondary winding member of a transformer under a condition in which a switching frequency corresponds to 5 MHz according to an embodiment of the present invention.

FIG. 15 is a diagram showing an electric current density distribution in a simple structure. In FIG. 15, an electrode structure of inside of FETs is modeled. Further, two kinds of models of a vertical FET in which a current path formed vertically and a horizontal FET in which a current path formed horizontally are located. In FIG. 15, under the condition in which a switching frequency is 1 Hz, the current density distribution is shown when the switch Q3 composed with the vertical FET and the switch Q5 composed with the horizontal FET are incorporated in (integrated with) the secondary winging W2. FIG. 16 shows a diagram of the current density distribution when the switching frequency used in FIG. 15 is changed from 1 Hz to 5 MHz. In each of the drawings explained above and FIGS. 18-20 explained below, the reference numerals D and S respectively are marked at the positions of drains and sources of the horizontal FET Q5. Further, the drain D and the source S are alternately arranged.

When the switching frequency for the switches Q3 and Q5 is 1 Hz, the conduction loss of the vertical FET Q3 is 0.600 W and the conduction loss of the horizontal FET Q5 is 0.621 W. On the other hand, when the switching frequency for the switches Q3 and Q5 becomes 5 MHz, the conduction loss of the vertical FET Q3 is 0.701 W and the conduction loss of the horizontal FET Q5 increases to 1.364 W. Particularly, the loss distribution of the horizontal FET Q5 intensively increases at the area adjacent to the primary winding member W1. Further, in the horizontal FET Q5, the conduction loss increases. On the other hand, in the vertical FET Q3, even when the switching frequency becomes high, the conduction loss does not increase so much.

Figure 17:
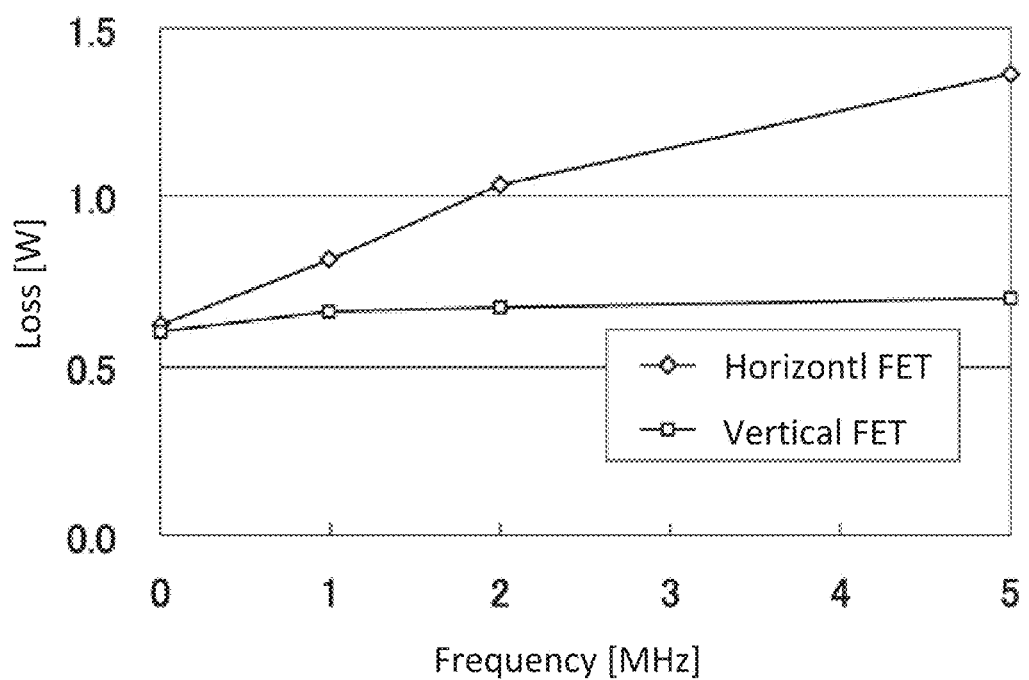
FIG. 17 is a graph that shows a relationship between a frequency and a loss for each of a horizontal-structure FET and a vertical-structure FET according to an embodiment of the present invention.

FIG. 17 is a graph that shows a relationship between a frequency and a conduction loss with respect to a vertical FET and a horizontal FET. As shown in FIG. 17, the conduction loss of the horizontal FET increases when the frequency becomes high. On the other hand, the conduction loss of the vertical FET does not increase so much even when the frequency becomes high.

Figure 18:
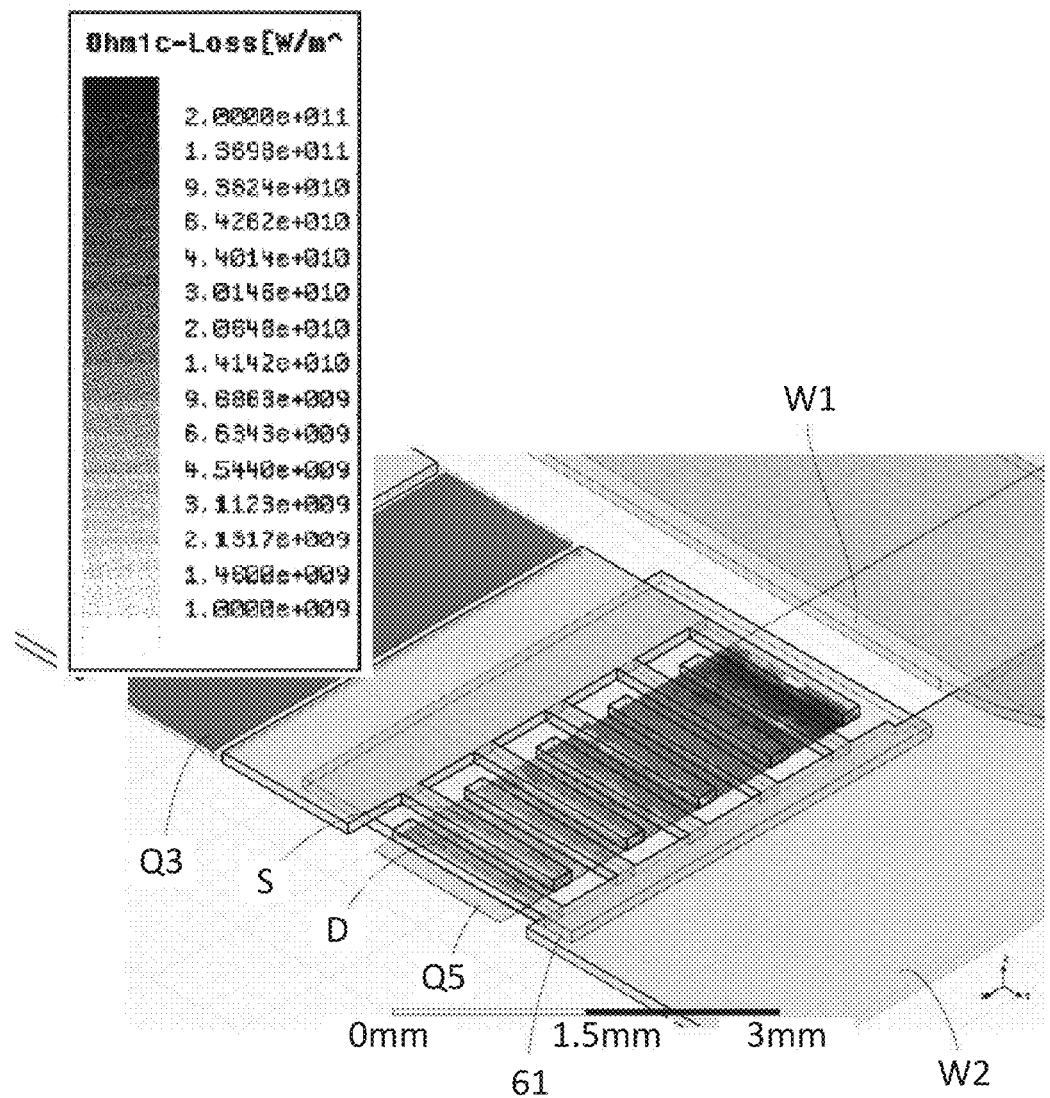
FIG. 18 is a diagram that shows a current density distribution when a shield layer is provided right under the horizontal-structure FET shown in FIG. 16.

FIG. 18 shows a current density distribution when a shield layer 61 made by a copper foil is provided right below the horizontal FET Q5 in addition to the state shown in FIG. 16. In this case, the conduction loss of the horizontal FET Q5 decreases from 1.364 W to 0.907 W. Further, the loss due to the shield layer 61 is 0.067 W.

Figure 19A:
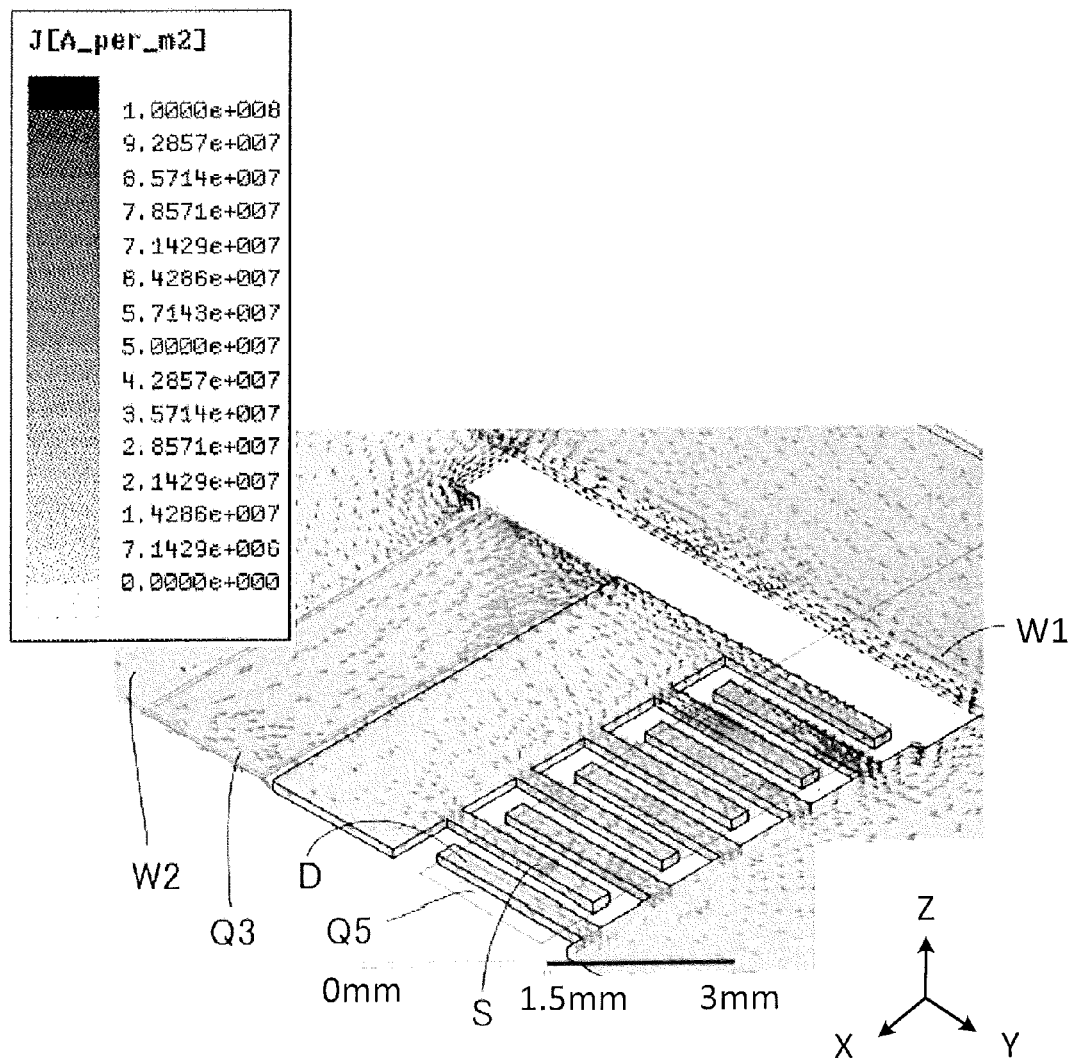
FIG. 19A shows a current flow diagram of an electrode before the shield layer is provided according to an embodiment of the present invention.
Figure 19B:
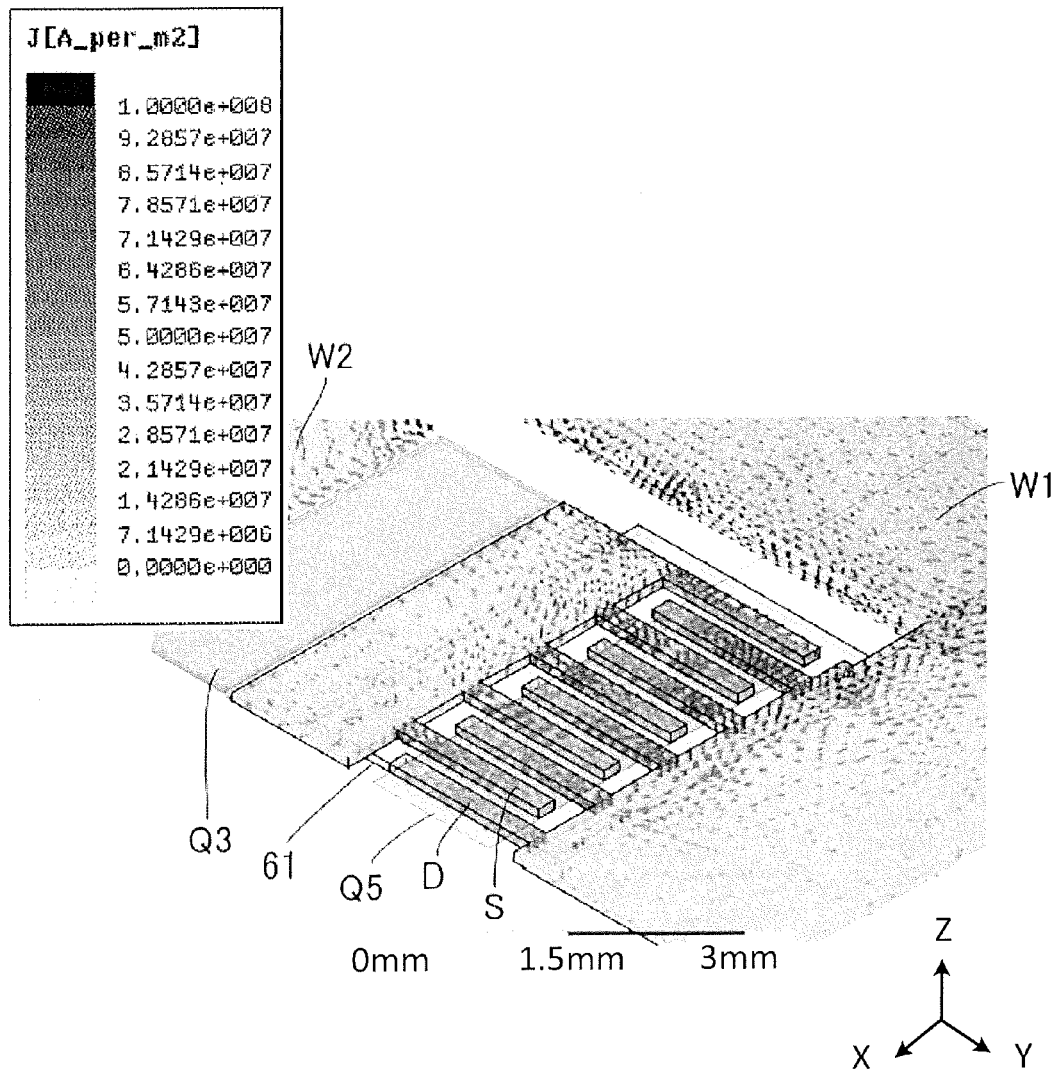
FIG. 19B shows a current flow diagram of the electrode after the shield layer is provided according to an embodiment of the present invention.
Figure 20:
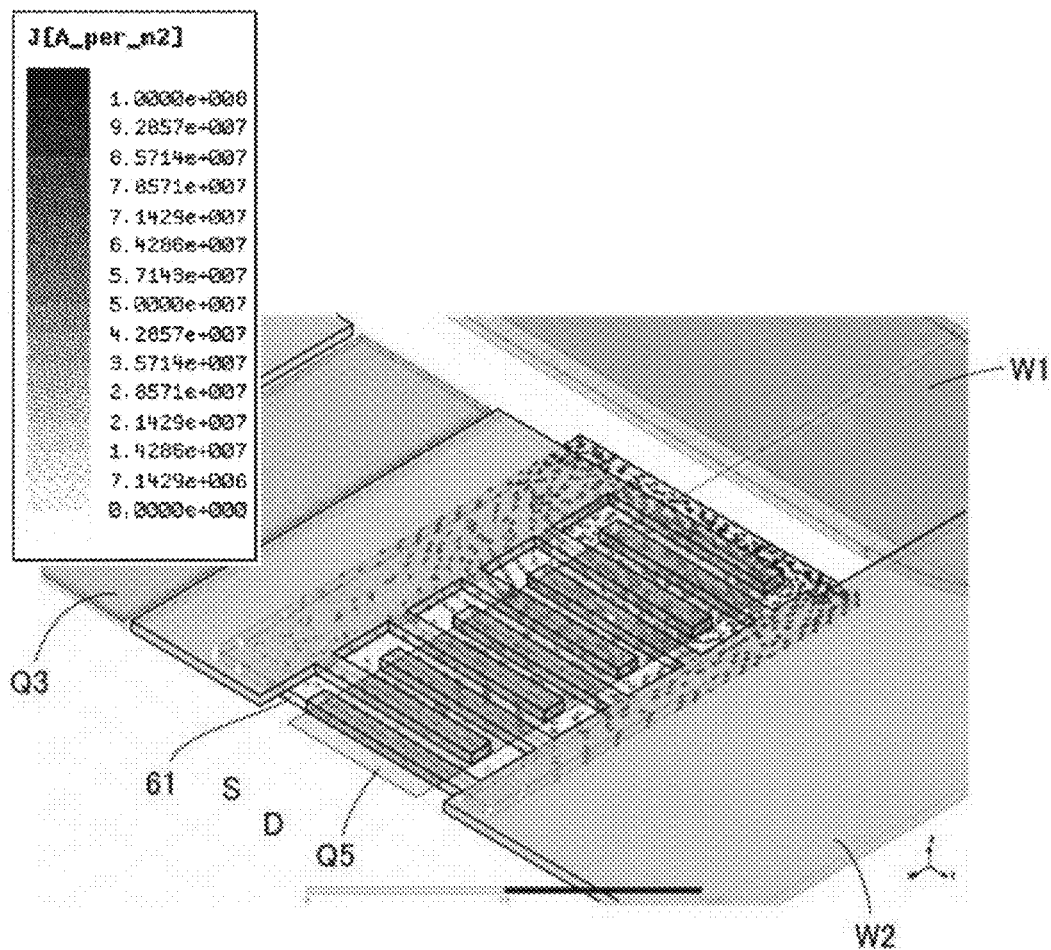
FIG. 20 is a current flow diagram of the shield layer according to an embodiment of the present invention.

FIGS. 19A-19B and 20 are diagrams showing an electric current flow. FIG. 19A shows an electric current flow distribution in an electrode before the shield layer 61 is provided. FIG. 19B shows an electric current flow distribution in the electrode after the shield layer 61 is provided. Further, FIG. 20 shows an electric current flow distribution in the shield layer 61.

According to each diagram explained above, because an eddy current is generated in the shield layer 61, the electric current in a source electrode S and a drain electrode D become uniform. As a result, the deviation of the electric current in the horizontal FET Q5 is resolved and the proximity effect between the horizontal FET Q5 and the shield layer 61 is removed. Further, because the shield layer 61 is made with copper, the conduction loss of the shield layer 61 is smaller than the horizontal FET Q5 and. As a result, the conduction loss including the horizontal FET Q5 and the shield layer 61 decreases.

As explained above, when the horizontal FET particularly such as the GaN-FET is used as the switches Q1 and Q2 of the primary side circuit and the switches Q3, Q4, Q5, and Q6 of the secondary side circuit, it is preferred that the conductive shield layer 61 is provided in the inner layer right below the horizontal FET in order to prevent the deviation of the electric current inside of the horizontal FET due to the proximity effect between the primary winding 11 and the secondary winding 12. When the horizontal FET is mounted on the part surface 21A of the board 21, the shield layer 61 is preferably provided in the other surface of an insulating base 22A of a first wiring body 25A as a second conductor 23B. Alternatively, if possible, the shield layer 61 can be provided on one surface of an insulating base 22B of a second wiring body 25B that is adjacent to the first wiring body 25A. Further, when the horizontal FET is mounted on the solder surface 21B of the board 21, the shield layer 61 is preferably provided on one surface of the insulating base 22B of the second wiring body 25B. Alternatively, if possible, the shield layer 61 can be provided as a second conductor 2B in the other surface of the insulating base 22A of the first wiring body 25A that is adjacent to the second wiring body 25B.

As explained above, in the present embodiment, as the electronic circuit device that performs the electric power transmission between the primary side and the secondary side of the transformer T. The transformer T has the primary winding member W1 and the secondary winding member W2 that is magnetically coupled with the magnetic fluxes Φa1 and Φb1 that are generated by the electric currents Fa1 and Fb1 that flow in the primary winding member W1. Further, the primary winding member W1 is configured with the primary winding 11, the high side switch Q1, the low side switch Q2 and the capacitors C1, C2. Specifically, the primary winding 11 composes a part of the conductor 23 that is configured in the board 21. The high side switch Q1 and the low side switch Q2 correspond to the primary side elements that are electrically connected to the primary winding member W1. The secondary winding member W2 is configured with the secondary winding 12, the high side switches Q3, Q5 and the low side switches Q4, Q6. Specifically, the secondary winding 12 composes a part of the conductor 23 that is configured in the board 21. The high side switches Q3, Q5 and the low side switches Q4, Q6 correspond to the secondary side elements that are electrically connected to the secondary winding member W2. The DC-DC converter 1 with the configuration explained above according to the embodiment of the present invention is disclosed.

In this case, the high side switches Q1 and the low side switch Q2 that correspond to the primary side elements and the capacitors C1, C2 are incorporated as a part of the primary winding member W1 of the transformer T. At the same time, the high side switches Q3, Q5 and the low side switches Q4, Q6 that correspond to the secondary side elements are incorporated as a part of the secondary winding member W2 of the transformer T. As a result, the distance between the transformer T and the primary side element can be made close. Similarly, the distance between the transformer T and the secondary side element can also be made close. Therefore, the DC-DC converter 1 that has the compact structure on both the primary side and the secondary side of the transformer T and of which the entire miniaturization can be realized as the electronic circuit device can be provided.

Further, the primary winding member W1 explained above can contain other elements in addition to the primary winding 11 and the primary side element. At the same time, the secondary winding member W2 can also contain other elements in addition to the secondary winding 12 and the secondary side element.

Further, in the present embodiment, the primary winding 11 and the secondary winding 12 are located on the board 21. The primary winding 11, which is formed on the part surface 21A that corresponds to one outer surface of the board 21, and the secondary winding 12, which is formed on the solder surface 21B that corresponds to the other outer surface of the board 21, are provided.

In this case, because the primary winding 11 is located on the part surface 21A of the board 21 and the secondary winding 12 is located on the solder surface 21B of the board 21, the switches Q1, Q2, the capacitors C1 and C2 and the high side switches Q3, Q5 and the low side switches Q4, Q6 are directly installed on (integrated with) the part surface 21A and the solder surface 21B of the board 21 and can make these work as a part of the primary winding member W1 and the secondary winding member W2, respectively. Specifically, the switches Q1 and Q2 and the capacitors C1 and C2 correspond to the primary side elements and the high side switches Q3, Q5 and the low side switches Q4, Q6 that correspond to the secondary side elements. Further, the loss of the primary winding member W1 and the secondary winding member W2 in which the elements explained above are contained can be suppressed and the miniaturization of the entire DC-DC converter 1 can be realized.

Further, the board 21 in the present embodiment is formed by laminating a plurality of wiring bodies 25. The primary winding 11 and the secondary winding 12 are located on the board 21. Further, also in the second layer that corresponds to the inner layer of the board 21, at least one of the conductors 23 of the primary winding 11 and the secondary winding 12 is provided.

In this case, as the present embodiment, the conductor 23 that corresponds to the primary winding 11 of the transformer T is provide not only in the first and third layers that correspond to the outer layers of the board 21, but also in the second layer that corresponds to the inner layer of the board 21. At the same time, the above primary winding 11, which is provided in the first through third layers, is suitably connected to another conductor 23 that corresponds to the primary winding member W1 and that is provided on the outer layer of the board 21. Further, the conductor 23 that corresponds to the secondary winding 12 of the transformer T is provided in the second layer of the board 21. Then, the secondary winding 12 can be suitably connected to the conductor that corresponds to the secondary winding member W2 and that is provided in the outer layer of the board 21. Consequently, it can easily increase the number of the turns of the primary winding member W1 and the secondary winding member W2 and increase a current amount of the electric current flowing in the primary winding member W1 and the secondary winding member W2.

Further, when the primary winding 11 and the secondary winding 12 are not exposed to the outer surface of the board 21 and when the conductors 23 that correspond to the primary winding 11 and the secondary winding 12 of the transformer T are provided at only inside of the board 21, element mount areas of the outer surface of the board 21 increases. As a result, the miniaturization of the DC-DC converter 1 can be realized.

Further, the following configuration can also be provided. The primary winding 11 and the secondary winding 12 are provided at only inside the board 21. The primary side elements are located at one surface of the board 21, for instance, the part surface 21A. The secondary side elements are located at the other surface of the board 21, for instance, the solder surface 21B.

In this case, when at least two or more primary side elements that are incorporated in the primary winding member W1 exist and at least two or more secondary side elements that are incorporated in the secondary winding member W2 exist, the primary side elements and the secondary side elements are respectively and suitably located at the part surface 21A and the solder surface 21B of the board 21 and connected to the primary winding 11 and the secondary winding 12 by using the through holes, etc. As a result, it becomes possible to freely layout the primary side circuit and the secondary side circuit of the transformer T.

Further, when a current path from input or output terminals to nodes of primary or secondary wiring is in the following relative location, magnetic flux generated by a flowing electric current does not cross the primary winding member or the secondary winding member so that the magnetic flux does not affect the transformer performance. Specifically, when the pattern positions 28S and 28T, which correspond to a first current path from the input terminals Vi+ and Vi− of the DC-DC converter 1 to the nodes NodeA1 and NodeB1 of the primary winding member W1, substantially perpendicularly abuts the nodes NodeA1 and NodeB1 of the primary winding member W1, the magnetic flux that is generated by an electric current that flows in the first current path and reaching the primary winding member W1 from the input terminals Vi+, Vi− of the DC-DC converter 1 does not cross the primary winding member W1 and does not affect the performance as the transformer T. Further, when the pattern positions 29S and 29T, which correspond to a second current path from the output terminals Vo+ and Vo− of the DC-DC converter 1 to the nodes NodeA2 and NodeB2 of the secondary winding member W2, substantially perpendicularly abuts the nodes NodeA2 and NodeB2 of the secondary winding member W2, the magnetic flux that is generated by an electric current that flows in the second current path and reaching the output terminals Vo+ and Vo− of the DC-DC converter 1 from the secondary winding member W2 does not cross the secondary winding member W2 and does not affect the performance as the transformer T.

Further, in the present embodiment, when the elements, which are at least either of the switches Q1 and Q2 that correspond to the primary side elements and the switches Q3, Q4, Q5 and Q6 that correspond to the secondary side elements, contain an FET, and at the same time, when the FET is a horizontal FET, the shield layer 61 is provided in the inner layer of the board 21 located right below the horizontal FET.

In this case, the shield layer 61 that is provided in the inner layer of the board 21 can prevent the proximity effect that is generated between the FET and the primary winding member W1 and the secondary winding member W2. As a result, it is possible to provide the efficient DC-DC converter 1 in which the conduction loss of the FET is decreased.

Further, in the present embodiment, it is preferred that the primary side circuit of the transformer T, which contains the primary winding member W1, has a half bridge configuration or a full bridge configuration and the secondary side circuit of the transformer T, which contains the secondary winding member W2, has a half bridge configuration or a full bridge configuration.

In this case, an electronic circuit device, for instance, the DC-DC converter 1 in which the primary side circuit and the secondary side circuit of the transformer T has the half bridge configuration or the full bridge configuration can be provided.

The embodiments of the present invention have been explained. The embodiments are not limited to the above disclosures. For instance, in the present embodiments, the DC-DC converter 1 is provided as the electronic circuit device. However, so long as the electric power transmission can be performed between a primary side and a secondary side of a transformer, any kinds of the electronic circuit devices can be adopted. Further, with respect to the circuit topology, although the half bridge circuit and the full bridge circuit are respectively used as the primary side circuit and the secondary side circuit, the primary and secondary circuits can respectively be chosen from one of the half bridge circuit and the full bridge circuit. Further, a choke coil can be added to a part where the output terminal Vo+ and/or the output terminal Vo− of the secondary side are led out.

The electronic circuit device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An electronic circuit device, comprising:
   a board that is formed of at least one insulating base;
   a patterned conductor that is formed on the at least one insulating base;
   a transformer that is provided at the board, the transformer having:
      a magnetic core;
      a primary winding member, the primary winding member being configured with:
         a primary winding that is an integrated part of the patterned conductor and that is provided at the board; and
         a primary side element that is incorporated in and electrically connected to the primary winding, wherein the primary side element is directly electrically connected to the primary winding without an intervening connecting pattern portion provided therebetween; and
      a secondary winding member, the secondary winding member being configured with:
         a secondary winding that is an integrated part of the patterned conductor and that is provided at the board; and
         a secondary side element that is incorporated in and electrically connected to the secondary winding, wherein the secondary side element is directly electrically connected to the secondary winding without an intervening connecting pattern portion provided therebetween,
      wherein each of the primary winding and the secondary winding is wound around the magnetic core, and the primary winding and the secondary winding are magnetically coupled with each other via the magnetic core; and
   a first current path that is an integrated part of the patterned conductor between an input terminal of the electronic circuit device and the primary winding member, the input terminal being provided on the board, wherein the first current path is located so as to perpendicularly abut the primary winding member so that a magnetic flux generated by an electric current flowing in the first current path does not cross the primary winding member.

2. The electronic circuit device according to claim 1, wherein
   the board has a first surface and a second surface opposite to the first surface, and
   the primary winding is located on the first surface of the board, and the secondary winding is located on the second surface of the board.

3. The electronic circuit device according to claim 2, wherein
   parts of the primary and secondary windings are located on the board, and
   at least one other part of either the primary winding or the secondary winding is further located in the board.

4. The electronic circuit device according to claim 2, wherein
   a second current path is an integrated part of the patterned conductor between an output terminal of the electronic circuit device and the secondary winding member, and the output terminal is located on the board, and
   the second current path is located so as to perpendicularly abut the second winding member so that a magnetic flux generated by an electric current flowing in the second current path does not cross the secondary winding member.

5. The electronic circuit device according to claim 2, wherein
   at least one of the primary side and secondary side elements is a field effect transistor,
   an inner shield layer is provided on an inside of the board, and
   the inner shield layer is located under the field effect transistor.

6. The electronic circuit device according to claim 2, wherein
   a plurality of primary elements configure a primary side circuit, and a plurality of secondary elements configure a secondary side circuit, and
   each of the primary and secondary side circuits is configured as one of a half bridge circuit and a full bridge circuit.

7. The electronic circuit device according to claim 1, wherein
   parts of the primary and secondary windings are located on the board, and
   at least one other part of either the primary winding or the secondary winding is further located in the board.

8. The electronic circuit device according to claim 7, wherein
   a second current path is an integrated part of the patterned conductor between an output terminal of the electronic circuit device and the secondary winding member, and the output terminal is located on the board, and the second current path is located so as to perpendicularly abut the second winding member so that a magnetic flux generated by an electric current flowing in the second current path does not cross the secondary winding member.

9. The electronic circuit device according to claim 7, wherein
at least one of the primary side and secondary side elements is a field effect transistor,
an inner shield layer is provided on an inside of the board, and
the inner shield layer is located under the field effect transistor.

10. The electronic circuit device according to claim 7, wherein
a plurality of primary elements configure a primary side circuit, and a plurality of secondary elements configure a secondary side circuit, and
each of the primary and secondary side circuits is configured as one of a half bridge circuit and a full bridge circuit.

11. The electronic circuit device according to claim 1, wherein
the board has a first surface and a second surface opposite to the first surface,
the primary and secondary windings are entirely located in the board, and
the primary winding is located at a side of the first surface, and the secondary winding is located at a side of the second surface.

12. The electronic circuit device according to claim 11, wherein
a second current path is an integrated part of the patterned conductor between an output terminal of the electronic circuit device and the secondary winding member, and the output terminal is located on the board, and
the second current path is located so as to perpendicularly abut the second winding member so that a magnetic flux generated by an electric current flowing in the second current path does not cross the secondary winding member.

13. The electronic circuit device according to claim 11, wherein
at least one of the primary side and secondary side elements is a field effect transistor,
an inner shield layer is provided on an inside of the board, and
the inner shield layer is located under the field effect transistor.

14. The electronic circuit device according to claim 11, wherein
a plurality of primary elements configure a primary side circuit, and a plurality of secondary elements configure a secondary side circuit, and
each of the primary and secondary side circuits is configured as one of a half bridge circuit and a full bridge circuit.

15. The electronic circuit device according to claim 1, wherein
a second current path is an integrated part of the patterned conductor between an output terminal of the electronic circuit device and the secondary winding member, and the output terminal is located on the board, and
the second current path is located so as to perpendicularly abut the second winding member so that a magnetic flux generated by an electric current flowing in the second current path does not cross the secondary winding member.

16. The electronic circuit device according to claim 15, wherein
at least one of the primary side and secondary side elements is a field effect transistor,
an inner shield layer is provided on an inside of the board, and
the inner shield layer is located under the field effect transistor.

17. The electronic circuit device according to claim 15, wherein
a plurality of primary elements configure a primary side circuit, and a plurality of secondary elements configure a secondary side circuit, and
each of the primary and secondary side circuits is configured as one of a half bridge circuit and a full bridge circuit.

18. The electronic circuit device according to claim 1, wherein
at least one of the primary side and secondary side elements is a field effect transistor,
an inner shield layer is provided on an inside of the board, and
the inner shield layer is located under the field effect transistor.

19. The electronic circuit device according to claim 18, wherein
a plurality of primary elements configure a primary side circuit, and a plurality of secondary elements configure a secondary side circuit, and
each of the primary and secondary side circuits is configured as one of a half bridge circuit and a full bridge circuit.

20. The electronic circuit device according to claim 1, wherein
a plurality of primary elements configure a primary side circuit, and a plurality of secondary elements configure a secondary side circuit, and
each of the primary and secondary side circuits is configured as one of a half bridge circuit and a full bridge circuit.

* * * * *